(12) United States Patent
Routt

(10) Patent No.: US 7,451,292 B2
(45) Date of Patent: Nov. 11, 2008

(54) METHODS FOR TRANSMITTING DATA ACROSS QUANTUM INTERFACES AND QUANTUM GATES USING SAME

(76) Inventor: Thomas J Routt, 711 Driftwood Rd., Edmonds, WA (US) 98020

(*) Notice: Subject to any disclaimer, the term of this patent is extended or adjusted under 35 U.S.C. 154(b) by 1362 days.

(21) Appl. No.: 10/637,773

(22) Filed: Aug. 8, 2003

(65) Prior Publication Data

US 2004/0078421 A1    Apr. 22, 2004

Related U.S. Application Data

(60) Provisional application No. 60/402,427, filed on Aug. 10, 2002.

(51) Int. Cl.
| | |
|---|---|
| G06F 5/06 | (2006.01) |
| G06F 15/76 | (2006.01) |
| G06F 12/00 | (2006.01) |
| H01L 29/06 | (2006.01) |
| H01B 12/00 | (2006.01) |

(52) U.S. Cl. ............................... 712/14; 712/11; 712/16; 711/212; 713/600; 257/14; 257/34; 505/193

(58) Field of Classification Search .................. 712/11, 712/16, 14; 711/212; 257/14, 34; 505/193; 713/600
See application file for complete search history.

(56) References Cited

U.S. PATENT DOCUMENTS

| | | | | |
|---|---|---|---|---|
| 5,768,297 | A | 6/1998 | Shor | 371/40.1 |
| 6,301,029 | B1 | 10/2001 | Azuma | |
| 6,472,681 | B1 * | 10/2002 | Kane | 257/14 |
| 6,614,047 | B2 * | 9/2003 | Tzalenchuk et al. | 257/34 |
| 2002/0030186 | A1 | 3/2002 | Tomita | 257/14 |
| 2003/0164490 | A1 * | 9/2003 | Blais | 257/14 |
| 2003/0169041 | A1 * | 9/2003 | Coury et al. | 324/307 |
| 2005/0101489 | A1 * | 5/2005 | Blais et al. | 505/193 |

FOREIGN PATENT DOCUMENTS

WO    WO 99/53410    10/1999

OTHER PUBLICATIONS

Gottesman, Daniel et al., Quantum teleportation is a universal computational primitive, Aug. 2, 1999, pp. 1-6.
Xinlan, Zhou et al., Methodology for quantum logic gate construction, Aug. 1, 2000, pp. 1-17.
International Search Report dated Oct. 14, 2004.

* cited by examiner

*Primary Examiner*—Larry D Donaghue
(74) *Attorney, Agent, or Firm*—George N. Chaclas; Edwards Angell Palmer & Dodge LLP

(57) ABSTRACT

Quantum gaps exist between an origin and a destination that heretofore have prevented reliably utilizing the advantages of quantum computing. To predict the outcome of instructions with precision, the input data, preferably a qubit, is collapsed to a point value within the quantum gap based on a software instruction. After collapse the input data is restructured at the destination, wherein dynamics of restructuring are governed by a plurality of gap factors as follows: computational self-awareness; computational decision logic; computational processing logic; computational and network protocol and logic exchange; computational and network components, logic and processes; provides the basis for excitability of the Gap junction and its ability to transmit electronic and optical impulses, integrates them properly, and depends on feedback loop logic; computational and network component and system interoperability; and embodiment substrate and network computational physical topology.

35 Claims, 12 Drawing Sheets

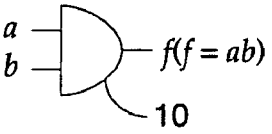
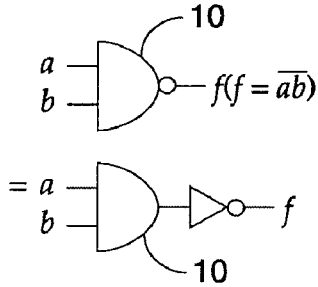
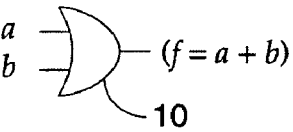
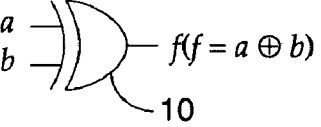
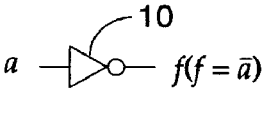
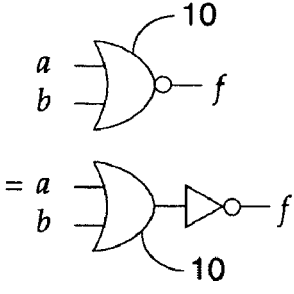
*FIGURE 1*

| | | |
|---|---|---|
| Hadamard | –[H]– | $\frac{1}{\sqrt{2}}\begin{bmatrix} 1 & 1 \\ 1 & -1 \end{bmatrix}$ |
| Pauli-X | –[X]– | $\begin{bmatrix} 0 & 1 \\ 1 & 0 \end{bmatrix}$ |
| Pauli-Y | –[Y]– | $\begin{bmatrix} 0 & -i \\ i & 0 \end{bmatrix}$ |
| Pauli-Z | –[Z]– | $\begin{bmatrix} 1 & 0 \\ 0 & -1 \end{bmatrix}$ |
| Phase | –[S]– | $\begin{bmatrix} 1 & 0 \\ 0 & i \end{bmatrix}$ |
| π/8 | –[T]– | $\begin{bmatrix} 1 & 0 \\ 0 & e^{i\pi/4} \end{bmatrix}$ |

Gates labeled 18, matrices labeled 20.

*FIGURE 3*

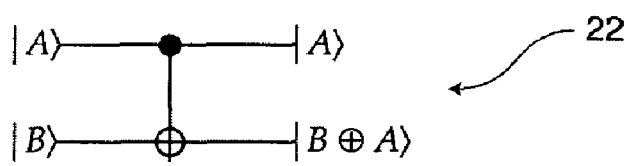

$$U_{CN} = \begin{bmatrix} 1 & 0 & 0 & 0 \\ 0 & 1 & 0 & 0 \\ 0 & 0 & 0 & 1 \\ 0 & 0 & 1 & 0 \end{bmatrix}$$

*FIGURE 4*

| Inputs | | | Outputs | | |
|---|---|---|---|---|---|
| a | b | c | a' | b' | c' |
| 0 | 0 | 0 | 0 | 0 | 0 |
| 0 | 0 | 1 | 0 | 0 | 1 |
| 0 | 1 | 0 | 0 | 1 | 0 |
| 0 | 1 | 1 | 0 | 1 | 1 |
| 1 | 0 | 0 | 1 | 0 | 0 |
| 1 | 0 | 1 | 1 | 0 | 1 |
| 1 | 1 | 0 | 1 | 1 | 1 |
| 1 | 1 | 1 | 1 | 1 | 0 |

METHODS FOR TRANSMITTING DATA ACROSS QUANTUM INTERFACES AND QUANTUM GATES USING SAME

CROSS-REFERENCE TO RELATED APPLICATION

This application claims priority to U.S. Provisional Patent Application No. 60/402,427, filed Aug. 10, 2002, which is incorporated herein by reference.

BACKGROUND OF THE INVENTION

1. Field of the Invention

The subject disclosure relates to quantum computing and related components, and more particularly to improved quantum computing gates, quantum computing memory registers, quantum computing switches and quantum computing routers using a data transmission process that collapses the data to a point value and reconstructs the data thereafter.

2. Background of the Invention

Classical computers are constructed from sets of electrical circuits containing wires and logic gates where the wires convey information around the circuit and the logic gates manipulate the information. The only non-trivial example of a classical single-bit logic gate is the NOT gate, whose operation is defined by its truth table, in which 0→1 and 1→0, meaning that the 0 and 1 states are interchanged.

FIG. 1 summarizes elementary classical (non-quantum) computing single- and multiple-bit logic gates 10 and their truth tables 12. Classical AND, NAND, OR, XOR and NOR gates receive two bits as input, and generate a single bit as output; the NOT gate receives and generates a single bit as input and output, respectively. The AND gate outputs 1 if and only if both of its inputs are 1. The NAND and NOR gates take the AND and OR, respectively, of their inputs, and apply a NOT function to the output. The XOR gate outputs the sum modulo 2 of its inputs.

Two classical gates not shown in FIG. 1 are the FANOUT and CROSSOVER gates. The FANOUT circuit gate enables bits to divide, that is, it replaces a bit with two copies of itself. The CROSSOVER gate interchanges the value of two bits. FIG. 1 also does not illustrate the preparation of additional ancilla or work bits, that create additional working space during classical computation.

Circuit elements ranging from simple to highly complex are routinely assembled from combinations of all of these classical gates to compute all possible classical functions. Five major elements that are utilized in universal circuit construction include: i) Wires, that preserve the states of bits; ii) Ancilla bits prepared in standard states and used in the n=1 case of a given proof; iii) The CROSSOVER operation; iv) The FANOUT operation; and v) The AND, XOR and NOT gates.

The limits of this time-tested approach to computing can be seen on the horizon. An extrapolation of the exponential trend of miniaturization, which has held since 1950 under Moore's Law, indicates the attainment of a limit of single-atom bits and Single Electron Transistors (SETs). Prior to efficient attainment of the single-atom bit and single-electron transistor scales, it will be necessary to use quantum effects to read bits from and write bits to the memory registers of nano-, pico-, (and soon thereafter) femto-, atto-, zepto- and yocto-scale computers and network nodes.

Moore's Law is exponential; any classical approach demands exponential increases in space or time. Even the Avagadro's number of elements in a molecular computer is quickly limited by the size of the exponential problem. Of all the candidate technologies to continue scaling beyond the Very Large Scale Integration (VLSI) era, quantum logic has one unique feature. Quantum computing accesses Hilbert space, the one exponential resource that has been untapped for computation.

Two essential bases to quantum computer and network systems are:

Fermions (named after the Italian physicist Enrico Fermi), which have ½-integer spin and cannot be in the same state due to the Pauli exclusion principle, and Bosons (named after the Indian physicist Satyendra Bose), which have integer spin and can share the same state.

Electrons are fermions, and photons are bosons. Electronic computing and networking is ultimately fermion-based, where $N_8$ must be either 0 or 1 because there cannot be more than one fermion in a single state. Optical computing and networking are ultimately boson-based, where, for bosons, the sum over $N_8$ runs from 0 to ∞.

Bosons (the ultimate basis of optical computing and networking) are particles whose spin is a whole number. Fermions (the ultimate basis of electronic computing and networking) are particles whose spin is half of a whole (odd) number—tend to give canceling quantum-mechanical contributions.

When the quantum jitters of a boson are positive, those of a fermion tend to be negative, and vice versa. Since supersymmetry ensures that bosons and fermions occur in pairs, substantial cancellations occur from the outset—cancellations that ultimately calm the apparently frenzied quantum effects.

Continuing trends in miniaturization have ushered in the inexorable requirement to use quantum physics to describe the elementary and complex operations of computers and networks. Classical models of computation, based on a mathematical idealization known as the Universal Turing Machine, are rendered invalid at the atomic ($10^{-10}$ meter) and electronic/photonic ($10^{-12}$ meter) quantum computational scales. At these or more expressed junctures, the entire spectrum of computing and computer networking—from design of quantum algorithms, to loading programs, loading network configurations, to running programs and configurations, to reading results—will necessarily be dominated by quantum effects.

While the Universal Turing Machine model is essentially flawed outside of classical physics-based computations, it is, however, as applicable today as it was at its inception by Alan Turing in 1936 (it is noteworthy that Alonso Church, Kurt Godel and Emil Post each independently created mathematical models of the computing process around the same period). The Deterministic Turing Machine (DTM) model consists of an infinitely long tape that is marked off into a sequence of cells on which can be written a '0', a '1', or a blank, and a read/write head that is able to move back and forth along the tape scanning the contents of each tape cell. The head therefore, can exist in one of a finite number of internal states and contains a set of instructions (that constitute the program) specifying how the state must change given the bit currently being read under the head, whether the bit should be subsequently changed, and in which direction the head should then be advanced. Unfortunately, the Turing model proves that, given sufficient time and memory capacity, there is not a single computation that a supercomputer can perform that a personal computer could not also perform.

The Probabilistic Turing Machine (PTM) model incorporates a DTM with the ability to make a random choice. The PTM has multiple possible successor states available to any given state, whereas a DTM, in a given state, reading a certain symbol, has precisely one successor state available to itself. However, the probabilistic computation model introduces tradeoffs between the time required to return an answer to a given computation, and the probability that the returned answer is correct. Therefore, if a correct answer is required (almost certainly always the case) uncertainty is encountered in the length of time a probabilistic algorithm must run. The Turing Machine model has been known to contain fundamental flaws since the early 1980s when it first became evident that DTM and PTM models were bounded by classical space-time symmetry physics. As computers, network nodes and their components increasingly miniaturize, their behavior must be properly described through the physics appropriate for small scales—quantum physics.

The first truly quantum Turing machine (QTM) was described in 1985 by David Deutsch of Oxford University following initial descriptions of quantum mechanical computation by Richard Feynman of Caltech in 1982. Whereas a classical Turing machine could only encode a '0', '1', or blank in each cell of its tape, a QTM could encode a blend, or "superposition," of '0', and '1' simultaneously. Quantum computing superposition encoding enables performance of calculations on all of the inputs in the time required to perform just one calculation classically, and is known as quantum parallelism.

The determination that each bit in a QTM can be a blend of a '0' and a '1' can be illustrated by representing each quantum bit, or qubit, as a vector contained within a sphere where a "straight up" position represents the (classical) binary value of '0', a "straight down" position represents the (classical) binary value of '1', and when the vector is at any other position, the angle the vector makes with the vertical axis is a measure of the ratio of '0-ness' to '1-ness' within the qubit. The angle made by this vector with the vertical axis is related to the relative contributions of the $|\psi_0\rangle$ and $|\psi_1\rangle$ eigenstates to the whole state. Therefore, a given qubit state can have equal proportions of '0-ness' and '1-ness' but actually displays differential amplitudes due to different phase factors.

A QTM can be considered as a quantum mechanical generalization of a PTM with the significant difference that in a classical PTM only one particular computational trajectory is followed, whereas within a QTM all computational trajectories are followed and the resulting superposition results from the summation over all possible trajectories achievable in time t.

FIG. 2 represents a qubit both in terms of electronic states within an atom 14, and as points on a unit three-dimensional sphere called a Bloch sphere 16. Quantum computers are built from quantum circuits containing wires and elementary quantum gates that propagate and manipulate quantum information. Changes that occur to a quantum state can be described using the language of quantum computation. A process that transforms the quantum state $|0\rangle$ to $|1\rangle$ suggests a quantum logic analog to the classical NOT operation. However, specifying the action of the gate on the states $|0\rangle$ and $|1\rangle$ does not necessarily reveal what happens to superpositions of the states $|0\rangle$ and $|1\rangle$. In fact, the quantum NOT gate behaves linearly, that is, it transforms the state $$\alpha|0\rangle + \beta|1\rangle \quad \text{(Formula 1)}$$

to the corresponding state in which the roles of $|0\rangle$ and $|1\rangle$ are interchanged:

$$\alpha|1\rangle + \beta|0\rangle. \quad \text{(Formula 2)}$$

Linear behavior is a general property of quantum computational systems. Therefore, we can define a matrix X to represent the quantum NOT gate as $$X \equiv \begin{bmatrix} 0 & 1 \\ 1 & 0 \end{bmatrix}. \quad \text{(Formula 3)}$$

The quantum state $\alpha|0\rangle + \beta|1\rangle$ is written in vector notation as $$\begin{bmatrix} \alpha \\ \beta \end{bmatrix}, \quad \text{(Formula 4)}$$

where the top entry represents the amplitude for $|0\rangle$ and the bottom entry represents the amplitude for $|1\rangle$, resulting in the following output from the quantum NOT gate $$X \begin{bmatrix} \alpha \\ \beta \end{bmatrix} = \begin{bmatrix} \beta \\ \alpha \end{bmatrix}. \quad \text{(Formula 5)}$$

Single-qubit quantum gates can be described by 2×2 matrices where the only constraint is the matrix U describing the single qubit gate be unitary, that is, U⁺U=I, where U⁺ is the adjoint of U (this is obtained by transposing and then complex-conjugating U), and where I is the 2×2 identity matrix.

Two significant single-qubit gates are the Z gate and the Hadamard gate. The Z gate leaves $|0\rangle$ unchanged and flips the sign of $|1\rangle$ to $-|1\rangle$:

$$Z \equiv \begin{bmatrix} 1 & 0 \\ 0 & -1 \end{bmatrix}. \quad \text{(Formula 6)}$$

The Hadamard gate (also known as the 'square-root of NOT' gate), transforms a $|0\rangle$ into a $[(|0\rangle+|1\rangle)/\sqrt{2}]$ (first column of the H matrix, midpoint between $|0\rangle$ and $|1\rangle$), and transforms a $|1\rangle$ into a $[(|0\rangle-|1\rangle)/\sqrt{2}]$ (second column of the H matrix, also at the midpoint between $|0\rangle$ and $|1\rangle$):

$$H \equiv \frac{1}{\sqrt{2}} \begin{bmatrix} 1 & 1 \\ 1 & -1 \end{bmatrix}. \quad \text{(Formula 7)}$$

Hadamard gate properties for quantum computation can be understood fundamentally as an arbitrary qubit unitary gate that can be decomposed as a product of rotations and reflections of a Bloch sphere, where the Hadamard operation is a rotation of the sphere about the y axis by 90°, followed by a reflection through the x-y plane. In general, an arbitrary single qubit unitary gate can be decomposed as a product of rotations as $$\begin{bmatrix} \cos\frac{\Upsilon}{2} & -\sin\frac{\Upsilon}{2} \\ \sin\frac{\Upsilon}{2} & \cos\frac{\Upsilon}{2} \end{bmatrix} \quad \text{(Formula 8)}$$

and a gate can be represented as being a rotation about the z axis with a global phase shift expressed as a constant multiplier of the form $e^{i\alpha}$:

$$\begin{bmatrix} e^{-i\beta/2} & 0 \\ 0 & e^{i\beta/2} \end{bmatrix} \quad \text{(Formula 9)}$$

In general, quantum computation (the quantum circuit model of computation) requires the following key elements:

Suitable state space; quantum computational circuits operate on some number, n, of qubits, therefore, the quantum computational state space is a $2^n$-dimensional Hilbert space, with product state of the form $|X_1, \ldots, X_n\rangle$, where ($X_i$=0,1) are called computational basis states.

Any computational basis state $|X_1, \ldots, X_n\rangle$ can be prepared in $\leq$n steps.

Quantum gates that can be applied to any subset of qubits and a universal family of gates that can be implemented.

Ability to perform measurements in the computational basis of $\geq$1 qubit(s).

Inherent ability to perform classical (non-quantum) computations if quantum computations are not required.

FIG. 3 summarizes single-qubit (quantum computing) gates 18 and their corresponding Unitary matrices 20. The overall purpose of all computational logic gates is to enable the processing of algorithms—classical and quantum. From a single-qubit gate perspective, a qubit is a vector $|\psi\rangle$= a|0⟩+b|0⟩ that is parameterized by two complex numbers that satisfy $|a|^2+|b|^2=1$. A single qubit in the state a|0⟩+b|1⟩ can be visualized as a point $(\theta, \phi)$ on the Bloch unit sphere [the vector $(\cos \phi \sin \theta, \sin \phi \sin \theta, \cos \theta)$ is the Bloch vector], where $a=\cos(\theta/2)$, $b=e^{i\phi}\sin(\theta/2)$, and a is assumed to be real since the overall phase of the state is unobservable.

FIG. 4 depicts the prototypical controlled-NOT (CNOT) quantum logic gate 22 and a matrix representation thereof 24. CNOT is a quantum gate with two input qubits—the control qubit and target qubit, respectively. The action of the CNOT gate is given by $|c\rangle|t\rangle \rightarrow |c\rangle|t \oplus c\rangle$ where $\oplus$ is addition modulo 2 and, if the control qubit is set to |1⟩ then the target qubit is flipped, otherwise, the target qubit is not changed. The control and target qubits are XORed and stored in the target qubit.

The Toffoli gate 26 and its corresponding truth table 28 is shown in FIG. 5 and is interesting because it can be implemented both as a classical and as a quantum logic gate. One of its main roles as a quantum gate is to enable simulation of classical logic circuitry. Whereas several classical logic gates such as the NAND gate are inherently irreversible, any classical circuit can be replaced by an equivalent quantum circuit containing only reversible elements through use of the reversible Toffoli quantum gate. The Toffoli gate has three input bits and three output bits, where two of the bits are control bits that are unaffected by the action of the gate. The third bit is a target bit that is flipped if both control bits are set to 1, otherwise the target bit is not changed. Reversibility of the Toffoli gate is shown by applying the gate twice to a set of bits as $[(a,b,c) \rightarrow (a,b,c \oplus ab) \rightarrow (a,b,c)]$.

Quantum logic gates are the basic units of quantum computational algorithms just as classical logic gates are the basic units of classical computational algorithms. The major distinction between the quantum and classical computational contexts is that quantum gates must be implemented unitarily and, in particular, must incorporate reversible operations. The OR statement on two classical bits, for example, is not invertible since the four possible inputs {00, 01, 10, 11} map onto only two possible outputs {0, 1}.

Major quantum algorithmic classes include:

Classical computations on a quantum computer; enabled, for example, by the Toffoli gate.

Quantum parallelism; a feature of several quantum algorithms that enables quantum computers to evaluate a function $f(x)$ for multiple different values of x simultaneously. If, for example, $f(x): \{0,1\} \rightarrow \{1,0\}$ is a function with a one-qubit domain and range, and a two-qubit quantum operation initializes in the state |x, y⟩, an appropriate sequence of quantum logic gates can transform this state $\rightarrow |x, y \oplus f(x)\rangle$, where $\oplus$ is addition modulo 2, the first register is the data register, and the second register is the target register. The transformation map $|x, y\rangle \rightarrow |x, y \oplus f(x)\rangle$ is unitary ($U_f$). Quantum circuits can be constructed that apply $U_f$ to inputs not in the computational basis and where the data register is prepared in the superposition $(|0\rangle+|1\rangle)/\sqrt{\square}$. A Hadamard gate, for example, acts on |0⟩, then $U_f$ is applied, with the resulting state $|0, f(0)\rangle+|1, f(1)\rangle/\sqrt{\square}$. This result contains information about both $f(0)$ and $f(1)$. A single quantum $f(x)$ circuit has therefore been used to evaluate the function for multiple values of x simultaneously.

Deutsch's algorithm; this quantum algorithm combines quantum parallelism with the interference property of quantum mechanics, resulting in the ability to determine a global property of $f(x)$, that is, $f(0) \oplus f(1)$, through a single evaluation of $f(x)$. The Deutsch-Jozsa algorithm is related.

Quantum simulation algorithm; simulation seeks to solve differential equations that capture laws governing the dynamic behavior of a system. Classical computation cannot effectively simulate quantum system behavior as even simple quantum systems are governed by Schrödinger's equation $$i\hbar \frac{d}{dt}|\psi\rangle = H|\psi\rangle \quad \text{(Formula 10)}$$

and a significant issue is the exponential ($2^n$) number of differential equations that must be solved. The quantum simulation algorithm is concerned with the solution of $$id|\psi\rangle/dt = H|\psi\rangle \quad \text{(Formula 11)}$$

which, for a time-dependent H, is $$|\psi(t)\rangle = e^{-iHt}|\psi(0)\rangle \quad \text{(Formula 12)}$$

Quantum Fast Fourier Transform (QFFT); The QFFT is the key component of quantum factoring, order-finding, period-finding, order of a permutation, hidden linear function, and Abelian stabilizer algorithms. The discrete (non-quantum) Fast Fourier Transform (FFT) receives as input a vector of complex numbers, $x_0, \ldots, x_{N-1}$ where the length N of the vector is fixed. The transformed data is output as a vector of complex numbers $y_0, \ldots, y_{N-1}$ where $$y_k \equiv \frac{1}{\sqrt{N}} \sum_{j=0}^{N-1} x_j e^{2\pi i jk/N}. \quad \text{(Formula 13)}$$

QFFT performs the same transformation as the classical FFT, with the notable exception that the quantum transform is computed on an orthonormal basis $|0\rangle, \ldots, |N-1\rangle$, where a linear operator performs the following on the basis states:

$$|j\rangle \rightarrow \frac{1}{\sqrt{N}} \sum_{k=0}^{N-1} e^{2\pi i jk/N} |k\rangle. \qquad \text{(Formula 14)}$$

The QFFT action on an arbitrary state is $$\sum_{j=0}^{N-1} x_j |j\rangle \rightarrow \sum_{k=0}^{N-1} y_k |k\rangle, \qquad \text{(Formula 15)}$$

where the amplitudes $y_k$ are the discrete Fourier transform of the amplitudes $x_j$.

Quantum factoring; finding the prime factorization of an n-bit integer requires approximately $\exp(\Xi(n^{1/3} \log^{2/3} n))$ operations using the classical number field sieve, is exponential in the size of the number being factored, and therefore quickly becomes an intractable problem with increasing values of n. By contrast, quantum computers can factor any number exponentially faster than the most efficient classical factoring algorithms, using $O(n^2 \log n \log \log n)$ operations.

Quantum search algorithm (a.k.a. Grover's algorithm); rather than search through a space of N elements directly, a quantum oracle can be invoked to, for example, focus on the index to those elements, which is a number $0 \leq$ element index $\leq N-1$. If $N = 2^n$, the index can be stored in n qubits, and the quantum search problem will have M solutions, with $1 \leq M \leq N$. The quantum search oracle obtains a search solution within $O(\sqrt{N/M})$ iterations. In general, quantum search problems can be formulated in terms of an oracle $f(x)$ that equals 1 for arguments x that solve the problem of interest, where x may be, for example, a pair of integers and $f(x)$ a check for prime factors, or x may be database entries and $f(x)$ a test for answers to a query. Lov Grover has shown that a quantum computer can solve the quantum search problem in $\sqrt{N}$ steps. The quantum search algorithm is also referred to as the database search algorithm where a quantum database is structured in quantum memory containing $N = 2^n$ cells of 1 qubits each and the contents $d_x$ of the xth memory cell are added to the data register as $|d\rangle \rightarrow |d \oplus d_x\rangle$, and where the addition is performed bitwise, modulo 2.

Quantum counting; classical computation requires $\Xi(N)$ iterations with an oracle to determine the number of solutions, M, to an N item search problem if M is not known in advance. Quantum counting estimates the number of solutions significantly more rapidly by combining the Grover iteration with the phase estimation technique based upon the QFFT.

Quantum cryptography; classical cryptography includes private key and public key systems. The major challenge within private key cryptosystems is secure distribution of key bits. Quantum cryptography, or quantum key distribution (QKD) uses the principles of quantum mechanics to enable provably secure distribution of private information, and utilizes quantum corollaries of classical private cryptography, information reconciliation (error-correction conducted over a public channel) and privacy amplification. QKD is provably secure in that private key bits can be created between two parties over a public channel and the key bits can be used to implement a classical private key cryptosystem, enabling parties to communicate securely.

The QKD protocol transmits non-orthogonal qubits over a public channel. The sender and receiver establish an upper bound on any noise or eavesdropping occurring within their communication channel through the use of 'check' qubits that are randomly interspersed among data qubits. Information reconciliation and privacy amplification are then performed to distill a shared secret key string with security of the resulting key ensured by the properties of quantum information.

Three QKD protocol cases are BB84, B92 and EPR, used in quantum teleportation. In the BB84 QKD protocol, for example, one user, Alice, initializes with a and b, two strings each of $(4+\delta)n$ random classical bits, which are next encoded as strings of a block of $(4+\delta)n$ qubits (cooperating quantum cryptographic users are generally referred to as Bob and Alice, and someone attempting to eavesdrop into a quantum communication channel is by convention referred to as Eve). These bits are next encoded as strings of a block of $(4+\delta)n$ qubits, $$|\psi\rangle = \bigotimes_{k=1}^{(4+\delta)n} |\psi a_k b_k\rangle, \qquad \text{(Formula 16)}$$

where $a_k$ is the kth bit of a, $b_k$ is the kth bit of b, and each qubit is one of the four states $|\psi_{00}\rangle = |0\rangle$ $|\psi_{10}\rangle = |1\rangle$ $|\psi_{01}\rangle = |+\rangle = (|0\rangle + |1\rangle)\sqrt{2}$ $|\psi_{11}\rangle = |-\rangle = (|0\rangle - |1\rangle)\sqrt{2}. \qquad \text{(Formula 17)}$ The four states of Formula 17 are not all mutually orthogonal and therefore no measurement can distinguish among all of them with certainty. At this point, Alice sends $|\psi\rangle$ to Bob over a public quantum communication channel. Bob receives $\epsilon(|\psi\rangle\langle\psi|)$, where $\epsilon$ describes the quantum operation that results from the combined effect of the channel between Bob and Alice, and to any possible eavesdropping actions by Eve. Bob then publicly announces this quantum operation state set and each of the three then has their unique quantum state set described by separate density matrices. It is also true that Alice has not revealed b and the noise $\epsilon$ may be a poor channel artifact in addition to possible eavesdropping by Eve.

Bob next measures each qubit in basis X or Z, as determined by a random $(4+\delta)n$ bit string b' which he creates, with his measurement result=a'. Next, Alice publicly announces b. Then, by public channel communication, Bob and Alice discard all bits in {a', a} except those for which corresponding bits of b' and b are equal. The remaining bits satisfy a'=a. Alice then randomly selects n bits (of a mutual $2^n$ bits) and announces the selection to Bob over a public channel. They both then publish and compare the value of these check bits and, if more than t bits disagree, they re-initialize the protocol. If t is mutually selected, they can then apply information reconciliation and privacy amplification algorithms to obtain m acceptably secret shared key bits from the remaining n bits.

Quantum Error-Correcting Codes; Classical network error detection and correction is well known and in prevalent use at multiple architectural layers. There are two basic approaches generally taken in classical (non-quantum) network designs for handling transmission errors: (1) Include sufficient redundant information with each block of data sent to enable the receiver to deduce the transmitted character correctly (error-correcting codes), or (2) Incorporate only sufficient redundancy to allow the receiver to determine that a transmission error has occurred (error-detecting codes).

Very generally, transmitted classical frames consist of m data bits and r redundant bits, or checkbits, where the total length equals n(n=m+r). An n-bit classical network transmission unit that contains data and checkbits is referred to as an n-bit codeword. Given two possible codewords, for example 10001001 and 10110001, an EXCLUSIVE OR (XOR) logic operation using modulo-2 arithmetic and yielding a remainder can determine that they differ by three bits. The number of bit positions in which a pair of codewords differs is the Hamming distance. This is significant because two codewords that are a Hamming distance d apart will require d single-bit errors to convert one into the other.

It was originally thought that analogous error-correction techniques would not apply to the quantum network transmission of qubits, due to the assumption that qubit measurement would force the collapse of the qubit into a specific state, therein losing superpositionality. It was also noted that an inherent problem exists with copying or cloning an arbitrary quantum state.

However, others have developed nine-, seven-, and five-qubit error-correcting codes (algorithms). For example, in U.S. Pat. No. 5,768,297 to Shor a nine-qubit error-correcting code is disclosed. Shor's nine-qubit error-correcting code, for example, presumes that one qubit is encoded into nine qubits via the following scheme:

$$\alpha|0\rangle + \beta|1\rangle \rightarrow \alpha(|000\rangle + |111\rangle) \oplus (|000\rangle + |111\rangle) \oplus (|000\rangle + |111\rangle) \; \beta(|000\rangle + |111\rangle) \oplus (|000\rangle + |111\rangle) \oplus (|000\rangle + |111\rangle),$$ (Formula 18)

where constant factors that can be recovered from the normalization are ignored. Once the nine qubits are received, the goal of the algorithm is to recover the original superposition, assuming that no greater than one Pauli-type error has occurred within the quantum network. Shor's code invokes specific quantum entanglements with additional, or ancillary, qubits and measures the ancillary qubits to correct any error. The process of error correction must be accomplished while retaining the original quantum information superposition.

Shor's code is a combination of the three-qubit phase-flip and bit-flip codes. In this algorithm, the qubit is first encoded using the phase-flip code:

$$|0\rangle \rightarrow |+++\rangle, |1\rangle \rightarrow |---\rangle.$$ (Formula 19)

The second step is to encode each of the qubits using the three-qubit phase-flip code. $|+\rangle$ is encoded as $(|000\rangle+|111\rangle)\sqrt{2}$, and $|-\rangle$ is encoded as $(|000\rangle-|111\rangle)\sqrt{2}$. This results in a nine-qubit code with codewords given by $$|0\rangle \rightarrow |0_L\rangle \equiv \frac{(|000\rangle + |111\rangle)(|000\rangle + |111\rangle)(|000\rangle + |111\rangle)}{2\sqrt{2}}$$ (Formula 20)

$$|1\rangle \rightarrow |1_L\rangle \equiv \frac{(|000\rangle + |111\rangle)(|000\rangle + |111\rangle)(|000\rangle + |111\rangle)}{2\sqrt{2}}.$$

FIG. 6 illustrates the quantum circuit 30 encoding the Shor algorithm. The first part of the circuit encodes the qubit using the three-qubit phase-flip code as described above. The second part of the circuit encodes each of these three qubits using the bit-flip code through use of three copies of the bit-flip encoding circuit. The result is that the Shor code can protect against phase-flip and qubit-flip errors on any qubit.

Quantum error-detection and error-correction can also be performed in the absence of measurement, using only unitary operations and ancilla systems prepared in standard quantum states. This technique is essentially the same as those used for modeling arbitrary quantum computing and networking operations. The major advantage of quantum error-detection and error-correction in the absence of measurement is that it becomes increasingly difficult for real-world quantum information systems to render a reliable procedure to perform quantum measurements. In essence, the solution is to introduce an ancilla system with basis states, $|i\rangle$, corresponding to possible error syndromes, where that system initializes in a standard pure state, $|0\rangle$, prior to error-correction. A unitary operator, U, is then defined on the principal system plus ancilla and operates on the whole state space. The result is that U preserves inner products and can also be extended to a unitary operator on the entire (Hilbert) state space.

In view of the above, several systems have been developed to utilize quantum computing. Techniques for maintaining and transmitting states are evolving. Some examples are illustrated in U.S. Pat. No. 5,768,297 to Shor and U.S. Publication No. 2002/0030186 to Tomita, and are incorporated herein by reference. However, none of these techniques have accomplished developing components that are extensible and interconnective on a cosmological level.

The currently observable universe is thought to have a scale of approximately $10^{27}$ meters (m), the atomic scale is $10^{-10}$ m, and there are thought to be $10^{80}$ atoms in the observable universe. Quantum computing and networking is ushered in at the nano-scale ($10^{-9}$ m) and functions intrinsically at the Angstrom (atomic, $10^{-10}$ m) and pico (photonic/electronic, $10^{-12}$ m) scales due to the earlier statement that classical (non-quantum) models of computation, based on a mathematical idealization known as the Universal Turing Machine, are rendered invalid at the atomic ($10^{-10}$ m) and electronic/photonic ($10^{-12}$ m) scales. This is due, as stated earlier to the extrapolation of the exponential trend of miniaturization, which has held since 1950 under Moore's Law, indicating the attainment of a classical computational limit of single-atom bits and single-electron transistors (SETs) by the year 2010, beyond which continued miniaturization and computational operation becomes classically infeasible.

The entire spectrum of computing and computer networking—from design of quantum algorithm, to loading program, loading network configurations, to running programs and configurations, to measuring and reading results—will be necessarily increasingly dominated by quantum effects at Angstrom ($10^{-10}$ m) and smaller scales. Non-quantum wires cannot be thinner than a single atom; classical (non-quantum) memories cannot have fewer than one electron.

As can be seen from the discussion above, quantum computing can provide significant advantages over classical methods. Therefore, there is a need for improved components to allow utilizing the advantages that quantum computing can offer.

SUMMARY OF THE INVENTION

It should be appreciated that the present invention can be implemented and utilized in numerous ways, including without limitation as a process, an apparatus, a system, a device and a method for applications now known and later developed. These and other unique features of the system disclosed herein will become more readily apparent from the following description and the accompanying drawings.

It is therefore an object of the present invention to provide a structure and method for extending the quantum processing scale and quantum communications scale to the cosmological scale and any subset thereof.

Picotechnologies

In a preferred embodiment, a quantum computation gate method is expressed in various picotechnologies (operating at the pico-scale, $10^{-12}$ m), the intrinsic domain of spintronics, quantum computation and quantum networking, based upon electronic spin rather than charge. The SET ($10^{-12}$ m scale), for example, can enable an electron to tunnel across an insulator onto a conducting island only if states are available to it on both sides, creating a periodic modulation called the Coulomb blockade in the charging current due to an integer number of electrons allowed on the island. This technology can also be applied to create a memory cell that stores a single electron.

Femtotechnologies

In a preferred embodiment, the invention may further include a quantum computational gate method expressed in various femtotechnologies (operating at the femto-scale, $10^{-15}$ m, the characteristic length of the Strong Force). Picotechnologies and femtotechnologies are intrinsic to quantum computing and quantum networking due to the quantum properties of superposition and quantum entanglement (the latter, where the spins of particles polarized together remain correlated even if the particles are spatially separated).

Attotechnologies

In a preferred embodiment, the invention may further include a quantum computational gate method expressed in various attotechnologies (operating at the atto-scale, $10^{-18}$ m—the characteristic length of the Weak Force), as well as at $10^{-19}$ m and/or $10^{-20}$ m scales.

Zeptotechnologies

In a preferred embodiment, the invention may further include a quantum computational gate method expressed in various zeptotechnologies (operating at the zepto-scale, $10^{-21}$ m), $10^{-22}$ m and/or $10^{-23}$ m.

Yoctotechnologies

In a preferred embodiment, the invention may further include a quantum computational gate method expressed in various yoctotechnologies (operating at the yocto-scale, $10^{-24}$ m), as well as at $10^{-25}$ m and/or $10^{-28}$ m scales.

Fermionic and Bosonic Domains

In a preferred embodiment, the invention may further include a quantum computational gate method expressed in the Fermionic and Bosonic Domains. The range of $10^{-18}$ m to $10^{-31}$ m scales is the elementary particle basis to electronic computing and electronic networking, and is the range of Fermi-matter fields, the fermionic domain. The scalar range of $10^{-18}$ m to $10^{-31}$ m is also the force field basis to optical computing and optical networking, and is the range of Bose-force fields, the bosonic domain. Elementary particles are resonant excitations of the fields. Elementary particles are the smallest packets (quanta of energy) of the Unified Field. Twenty-four fermionic elementary particles plus the bosonic elementary particles mediate the four forces and their fundamental force particles (photons for the Electromagnetic Force; weak gauge bosons for the Weak Force; gluons for the Strong Force; gravitons for the Gravitational Force). Force (Bose-force) and matter (Fermi-matter) fields are the initial relative expression of the Unified Field; there are four force fields and 24 matter fields. The Unified Field gives rise to the fundamental force fields (Bose Fields) and matter fields (Fermi Fields), which are expressed as optical and electronic computing and networking, respectively. The Unified Field also gives rise to the supersymmetric basis of the Quantum Gate 200—a quantum and pre-quantum computer and network gate that incorporates n-qubit addressability, unitarity, measurability, and computational reversibility.

In another embodiment, a quantum computational gate method is expressed at the $10^{-29}$ m. scale. In another embodiment, a quantum computational gate method is expressed at the $10^{-30}$ m. scale. In another embodiment, a quantum computational gate method is expressed at the $10^{-31}$ m. scale. In another embodiment, a quantum computational gate method is expressed at the $10^{-32}$ m. scale. In another embodiment, a quantum computational gate method is expressed at the $10^{-33}$ m. scale. In another embodiment, a quantum computational gate method is expressed at the $10^{-34}$ m. scale. In another embodiment, a quantum computational gate method is expressed at the $10^{-35}$ m. scale ($10^{-33}$ cm. Scale).

In one embodiment, an n-qubit quantum gate and quantum circuit is capable of operating n-qubit quantum memory registers, n-qubit quantum switch nodes, and n-qubit quantum router nodes. The quantum circuit performs quantum and classical computations enabling any unitary operation to be approximated to arbitrary accuracy. The quantum circuit contains quantum memory registers, quantum switch nodes, and quantum router nodes that are universally unitary, measurable, logically reversible, and extensible to cosmological computational scales and any subset thereof. The quantum circuit can switch, store and retrieve an exponential number of inputs using a polynomial number of qubits, and executes quantum algorithms. The quantum circuit enables definition, configuration and operation of singular and massively parallels quantum teleportation circuits, and incorporates a super-string gate (pre-quantum gate) wherein an n-superstring bit (n-subit) superstring memory register can store and retrieve an exponential number of inputs using a polynomial number of subits. Each calculation step within the quantum switch contains complete knowledge/memory of all previous steps and its computational relationship to the quantum memory register.

BRIEF DESCRIPTION OF THE DRAWINGS

So that those having ordinary skill in the art to which the disclosed system appertains will more readily understand how to make and use the same, reference may be had to the drawings wherein:

FIG. 1 is a representation of several classical gates with associated truth tables.

FIG. 3 is a representation of several qubit gates with associated unitary matrices.

FIG. 4 is a representation of a CNOT multiple-qubit gate with an associated unitary matrix.

DETAILED DESCRIPTION OF THE PREFERRED EMBODIMENTS

Figure 2B:
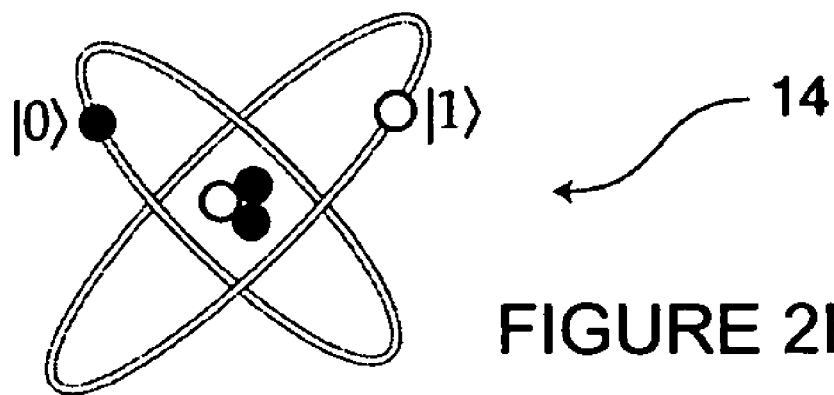
FIG. 2B is a somewhat schematic view of a Bloch sphere qubit representation.
Figure 2A:
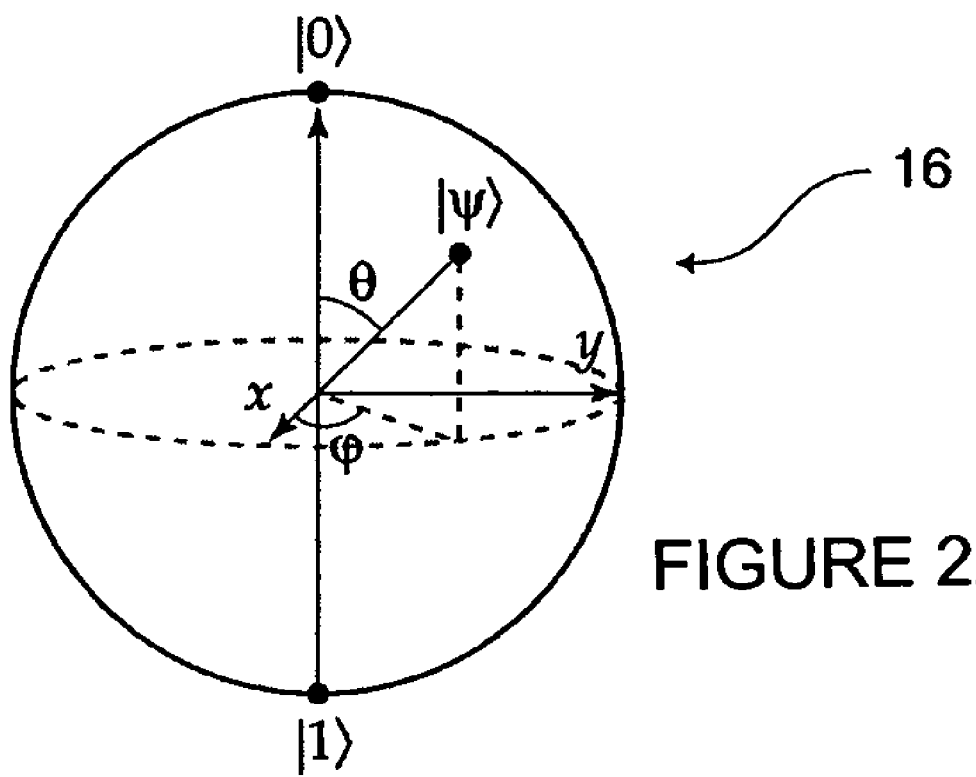
FIG. 2A is a somewhat schematic view of a qubit as two electronic states.
Figure 5:
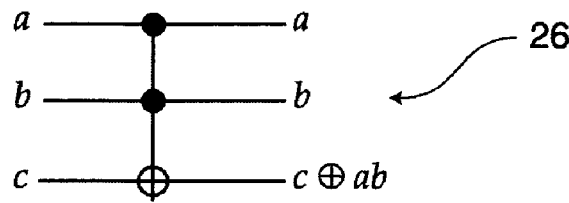
FIG. 5 is a representation of a Toffoli multiple-qubit gate with an associated truth table.
Figure 6:
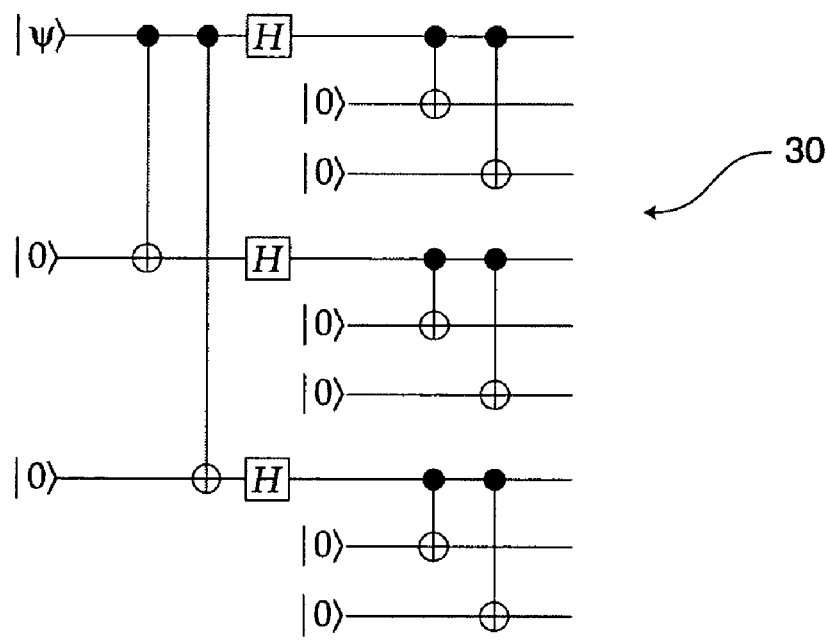
FIG. 6 is a representation of Shor's Nine-Qubit quantum error correction encoding circuit.

The present invention overcomes many of the prior art problems associated with implementing quantum computing. The advantages, and other features of the components disclosed herein, will become more readily apparent to those having ordinary skill in the art from the following detailed description of certain preferred embodiments taken in conjunction with the drawings which set forth representative embodiments of the present invention and wherein like reference numerals identify similar structural elements. For clarity throughout the following description, arrows are shown to indicate the direction and ellipses to indicate additional components, such shorthand is for clarity in reference to the figures and not meant in a limiting sense. Tables 1A and 1B provide a legend for the mathematical notation.

TABLE 1A

| scalars | a | general vectors | a |
|---|---|---|---|
| unit vectors | â | scalar product | a · b |
| vector cross-product | a × b | gradient operator | ∇ |
| Laplacian operator | $\nabla^2$ | derivative | $\frac{df}{dx}$, etc |
| parital derivatives | $\frac{df}{dx}$, etc | derivative of r with respect to t | ṙ |
| nth derivative | $\frac{d^n f}{dx^n}$ | closed loop integral | $\oint_L dl$ |
| closed surface integral | $\oint_S ds$ | matrix | A or $a_{ij}$ |
| mean value (of x) | <x> | binomial coefficient | $\binom{n}{r}$ |
| factorial | ! | unit imaginary ($i^2 = -1$) | i |
| exponential constant | e | modulus (of x) | \|x\| |
| natural logarithm | ln | log to base 10 | $\log_{10}$ |
| less than | < | exponentiation | exp |
| less than or equal to | ≦ | approaches | → |
| probability | Pr | addition modulo 2 | ⊕ |
| function of variable x | f(x) | tensor product | ⊗ |

TABLE 1A-continued

| logarithm | log | spin | S |
|---|---|---|---|
| absolute value of variable x | \|x\| | angular momentum | J |
| Planck constant | h | cosine | cos |
| h/(2π) | ℏ | sine | sin |
| wave function | ψ | complex number, fine-structure constant | α |
| complex number, fine-structure constant | β | weight, complex number, angular velocity | ω |
| summation | Σ | quantum bit (qubit) notation | \|0>, \|1> |

TABLE 1B

| greater than | > | eigenstate, state vector | \|ψ⟩ |
|---|---|---|---|
| greater than or equal to | ≧ | variable | n |
| variable | m | micro | μ |
| change | Δ | speed of light | c |
| wavelength | λ | frequency | f |
| nanometer | nm | optical input signal wavelength | $\lambda_s$ |
| optical pump wavelength | $\lambda_p$ | optical converted wavelength | $\lambda_c$ |
| Markovian/exponential | M | general | G |
| infinity | ∞ | Lagrangian | L |
| Hamiltonian | H | perturbation Hamiltonian | H' |
| Permittivity | ε | Permittivity of free space | $\epsilon_0$ |
| ohm | Ω | Angstrom | Å |
| integral, integration | ∫ | pi | π |

Quantum Gap

Figure 7:
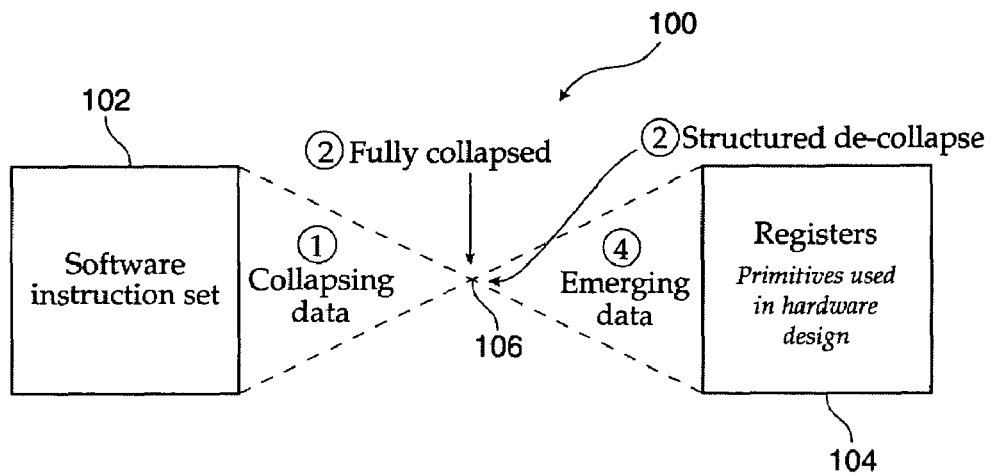
FIG. 7 is a somewhat schematic view of a quantum gap.
Figure 8:
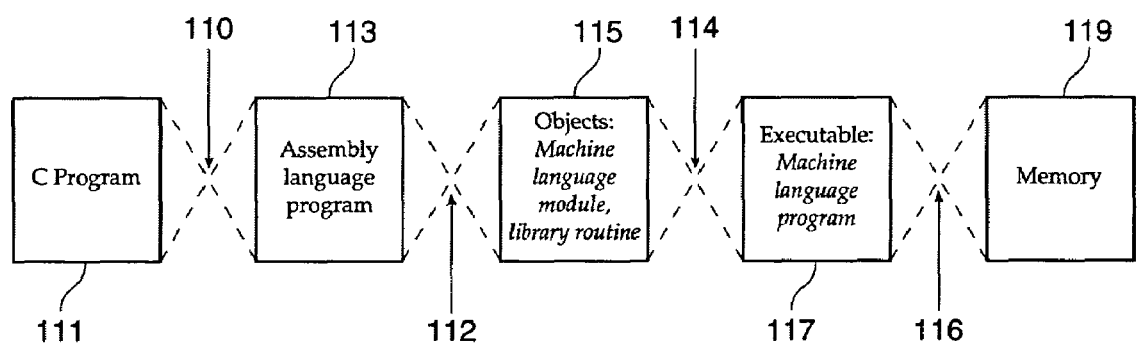
FIG. 8 is a somewhat schematic view of quantum gaps shown between a C program and an assembly language program, an assembly language program and objects, objects and executable, executable and memory.

FIG. 7 presents a generalized view of the quantum gap 100 as central to both classical and quantum computational and networking processes. The quantum gap 100 is the structural and functional interface between a given software instruction set 102 and hardware registers 104. Primitive and register are used interchangeably throughout the description herein. The software instruction set 102 is a computer program such as shown in FIG. 8 below. The hardware registers 104 are memory cells for storing data or qubits.

The bidirectional, sequential expression of software instructions into hardware primitives and hardware primitives into software instructions occurs through a process of collapse onto the point value of the quantum gap 100 from which the process is elaborated, leading to the emergence of the next software instruction or hardware primitive.

Four aspects of the quantum gap 100 are: (1) Collapsing data based on a software instruction and/or hardware primitive to a point value 106; (2) When the data is at a point value 106, the data is fully collapsed within the quantum gap 100; (3) After the data is fully collapsed, the data is restructured, i.e. de-collapsed. The dynamics of de-collapsing are governed by a summation of eight gap factors as follows; and (4) Ultimately, the data is reconstructed whether the reconstruction occurs at the software instruction set 102 or the hardware registers 104.

In short, the data path is bilateral. Emergence of post-Gap software instruction or hardware primitive is a function of instruction origination and direction.

Figure 13:
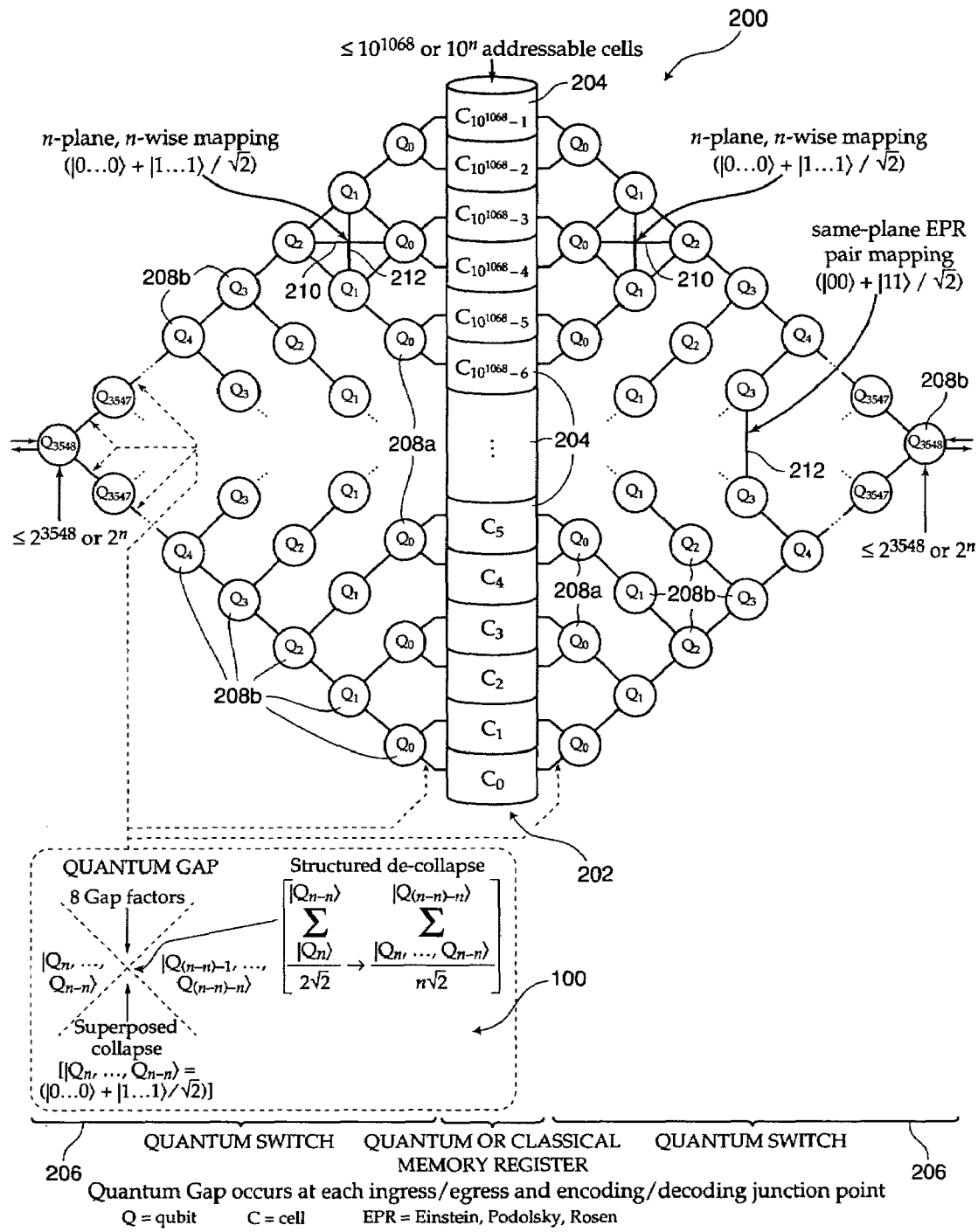
FIG. 13 is a somewhat schematic view of a gate having quantum gaps as shown in FIG. 7 between components.

As shown in FIG. 13, the fully collapsed data at the point value 106 (see FIG. 7) of the quantum gap 100 is defined in the n-qubit and n-quantum memory cell case by:

$$[(|Q_n, \ldots, Q_{n-n}> = |0 \ldots 0> + |1 \ldots 1>/\sqrt{2})] \quad \text{(Formula 21)}$$

Post-gap structuring (i.e., de-collapsing) dynamics are governed by a summation of eight gap factors given by:

$$\sum_{\frac{|Q_n\rangle}{2\sqrt{2}}}^{|Q_{n-n}\rangle} \rightarrow \sum_{|Q_n,\ldots,Q_{n-n}\rangle}^{|Q_{(n-n)-n}\rangle} \frac{}{n\sqrt{2}}.$$ (Formula 22)

The eight gap factors determine the accuracy and completeness of collapse. The integrity of these eight gap factors is crucial to ensure the precise and orderly progression of both classical and quantum intra-computer or inter-computer (network) information, as well as to the quality and wholeness of the emerging network computational step on the egress side of a particular gap. Otherwise, the software instruction or hardware primitive could be distorted and result in an inappropriate and partial experience of the signal, diminishing or preventing proper network computational flow. The eight gap factors are:

- The first gap factor, computational self-awareness, structures the status of the quantum gap 100 as a whole in terms of its general structure, feedback loops integral to its activation and deactivation, and readiness to respond.
- Computational decision logic; determines the ability of the quantum gap 100 to differentiate between various possible inputs of software instruction sets and hardware primitives, and orchestrates the sorting out and appropriate discrimination between their qualities.
- Computational processing logic; enables the quantum gap 100 to accommodate the passage of software instructions and hardware primitives without disturbing their integrity and structure.
- Network computational logical topology and associations; the space of the gap is crucial for intra-Gap processing.
- Computational and network protocol and logic exchange; the medium of transmission within the quantum gap 100 space is also crucial, depends on proper exchanges of protocols and logic, and maintains the liveliness of the quantum gap junction.
- Computational and network components, logic and processes; provides the basis for excitability of the quantum gap junction and its ability to transmit electronic and optical impulses, integrates them properly, and depends on feedback loop logic.
- Computational and network component and system interoperability; the structure and integrity of the Virtual Operand Instruction Set in which all of the components of the quantum gap 100 are permeated, depends on virtual logic interoperability.
- Embodiment substrate and network computational physical topology; the physical structure of all Gap junction components, and their number, position, and relationships, are also crucial, and depend on previous activation sequences.

FIGS. 8 through 11 elaborate the generalized quantum gap 100 introduced hereinabove in text and FIG. 7, and present specific examples of classical and quantum computational and networking processing gaps.

FIG. 8 presents specific instances of the generalized quantum gap 100 introduced in FIG. 7. These include:

- Compiler Gap 110, between instances of a C program 111 and assembly language program 113;
- Assembler Gap 112, between instances of an assembly language program 113 and objects 115 (e.g., machine language module, library routine);
- Linker Gap 114, between instances of machine language module 115 or library routine, and an executable 117 (machine language program); and
- Loader Gap 116, between instances of a machine language program executable 117 and memory 119.

Figure 9A:
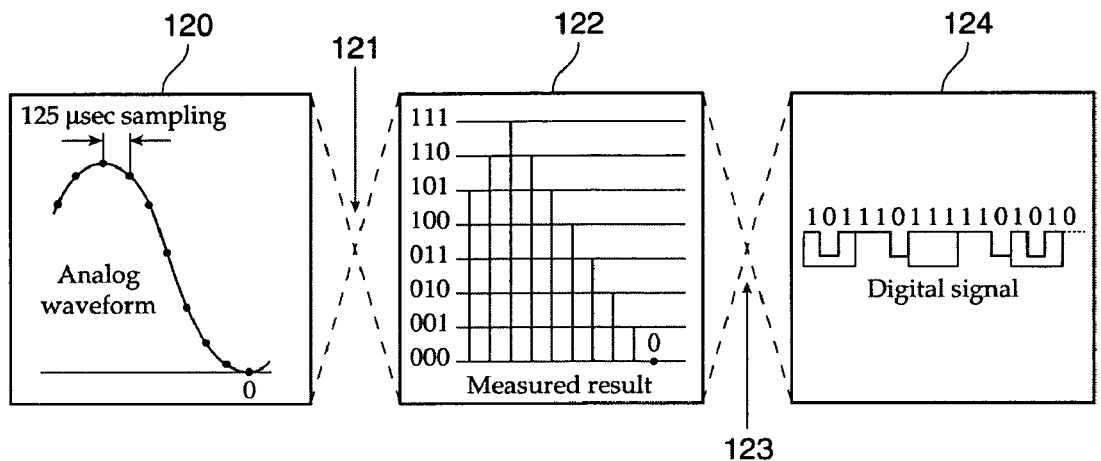
FIGS. 9A and 9B are somewhat schematic views of a quantum gap in a three-bit A/D and D/A conversion, respectively.
Figure 9B:
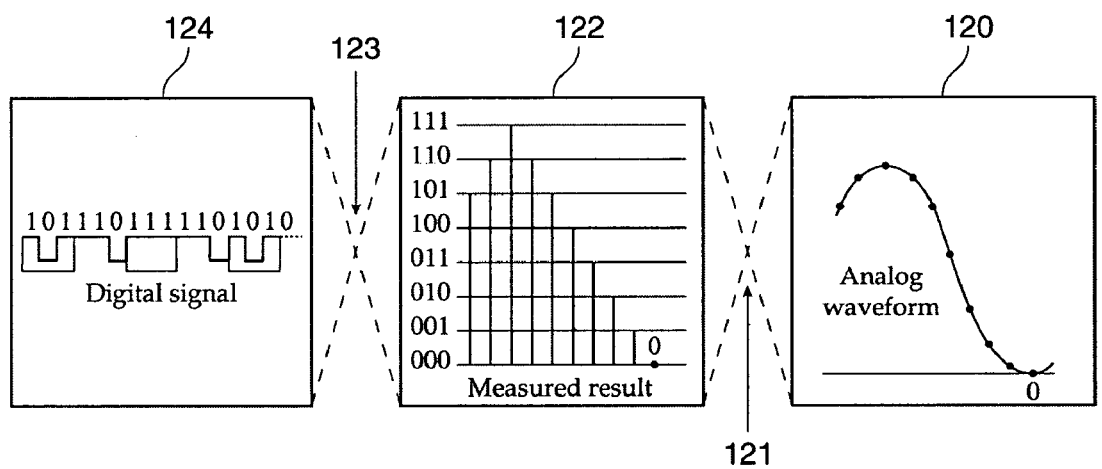

FIGS. 9A and 9B present a simplified sampling mechanism to digitize and convert an analog voice signal 120, generating Analog/Digital (A/D) and Digital/Analog (D/A) conversions, respectively. The example selects a simplified 3-bit (8-level) code with 125 μsec sampling intervals, yielding 8000 samples per second. A waveform 121 gap exists between the voice signal 120 and the measured result 122. Another gap, the digital gap 123, exists between the measured result 122 and digital signal 124.

Figure 10:
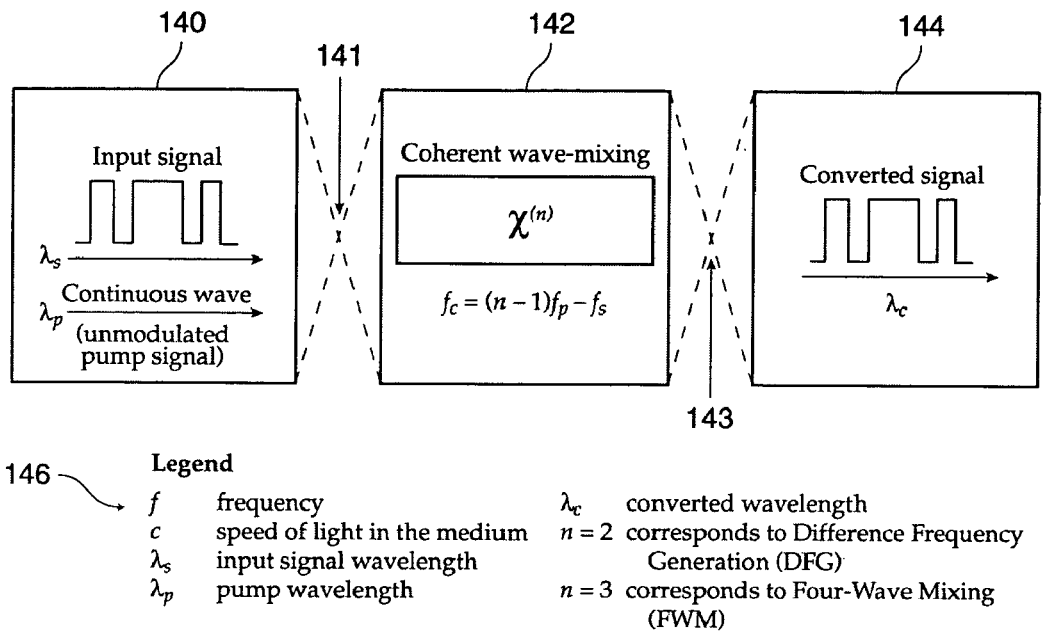
FIG. 10 is a somewhat schematic view of a quantum gap in a classical and quantum optical wave mixing case.

FIG. 10 presents an optical wavelength conversion gap using coherent effects based on wave-mixing with a legend 146. The quantum gaps are shown as a coherent wave-mixing gap 141 between an input signal 140 and coherent wave mixing 142 as well as a wavelength conversion gap 143 between the coherent wave mixing 142 and the converted signal 144. Wave-mixing:

- Arises from the nonlinear optical response of a medium when multiple waves are present;
- Preserves both phase and amplitude information;
- Enables simultaneous conversion of a set of multiple input wavelengths to a different set of multiple output wavelengths;
- Provides complete transparency; and
- Accommodates signals exceeding 100 Gbps.

Optical wavelength-routed networks partition and greatly enhance the bandwidth-carrying efficiency of the optical spectrum using wavelength division multiplexing (WDM) algorithms. The general technique is to first divide the optical spectrum into wavebands, and then to subdivide the wavebands into wavelength-specific channels (λ-channels). The assigned wavelengths of the λ-channels must be spaced sufficiently far apart to prevent overlap and interchannel crosstalk of neighboring spectra.

Optical wavelength λ and frequency f are related by fλ=c, where c is the velocity of light in the transmission medium, yielding the relation $$\Delta f \approx -\frac{(c\Delta\lambda)}{\lambda^2}$$ (Formula 23)

between small changes in frequency Δf and wavelength Δλ. Correspondence therefore exists at optical wavelength and frequency intervals of 100 Ghz≅0.8 nm in the range of 1550 nm, where the majority of lightwave networks operate. The total optical bandwidth occupied by modulated laser signals is designed to be less than the Equation 21 frequency spacing yield in order to leave sufficient "guard bands" to accommodate imprecision and drift in laser transmitter tuning.

Figure 11:
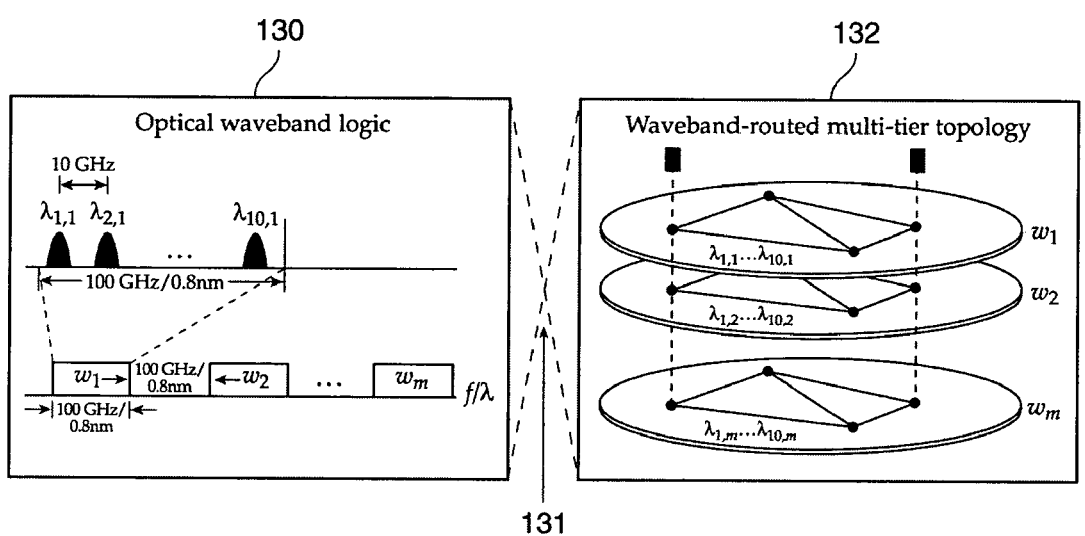
FIG. 11 is a somewhat schematic view a quantum gap in a classical and quantum optical waveband case.

FIG. 11 depicts an optical waveband-routed gap 131 between optical waveband logic 130 and waveband-routed multi-tier topology 132 that generates the two-tier, waveband-routed alternative described above. In this example, 100 GHz spectral width optical wavebands are placed at intervals of 200 GHz, separated by 100 GHz guardbands. The gap logic generates three possible outputs from this input:

- All λ-channels share a single copy of the resulting network topology;
- A multi-wavelength network with λ-channels on m wavelengths, $\lambda_1, \lambda_2, \ldots, \lambda_m$, is spaced sufficiently far apart to be switched independently (wavelength-routed network), is created containing m copies of one network, each with the same physical topology; and A two-tiered partitioning is selected, in which there are as many copies of the network as there are wavebands, with multiple λ-channels sharing each copy of the network.

The figure gap output expresses the third alternative as a waveband-routed multi-tier topology, the highest throughput compromise between exclusive and no wavelength switching/routing.

Figure 12:
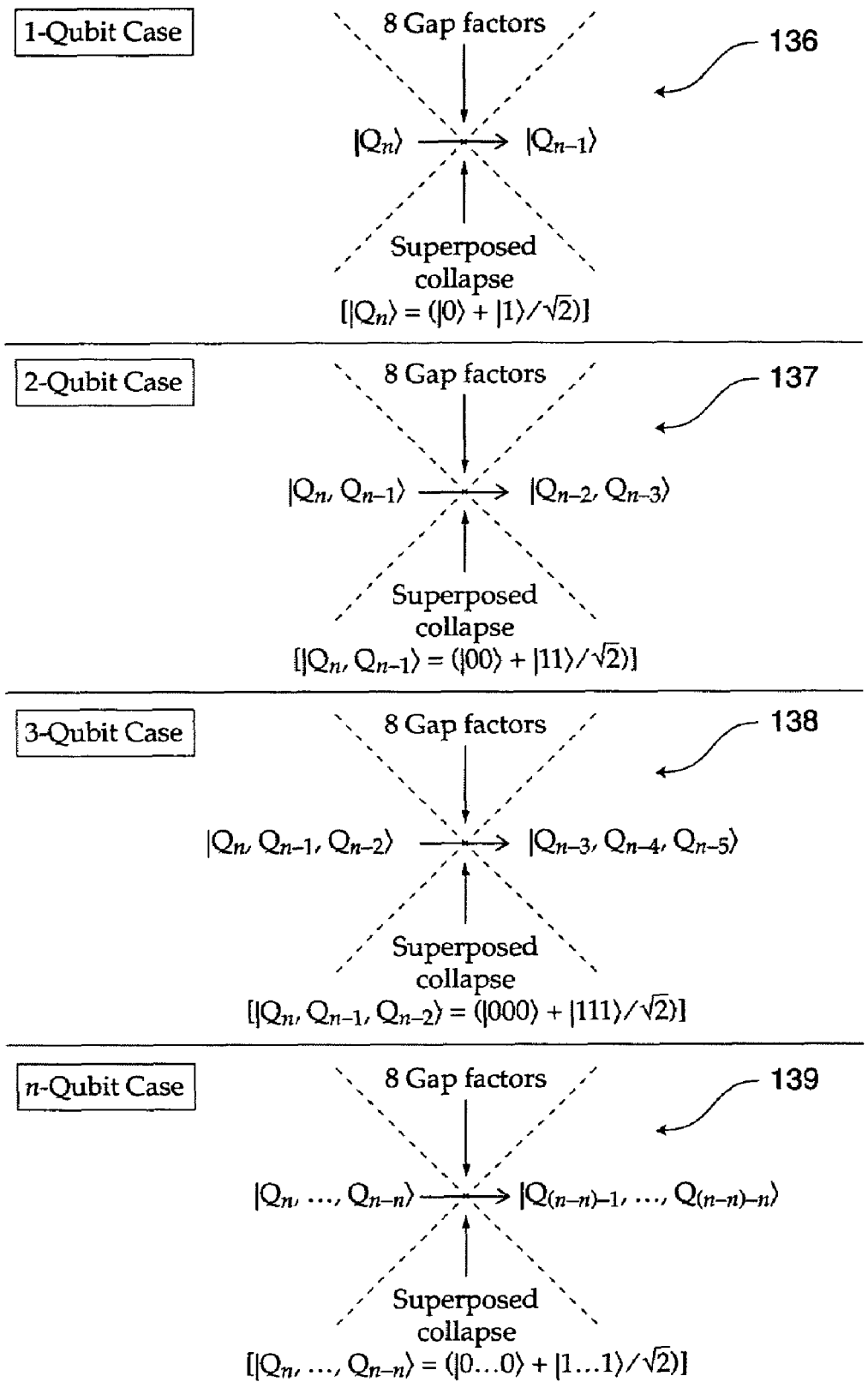
FIG. 12 is a somewhat schematic view of quantum gaps shown for several qubit examples with gap factors and superposed collapsed indications.

FIG. 12 illustrates a 1-qubit perspective 136, a 2-qubit perspective 137, a 3-qubit perspective 138 and an n-qubit perspective 139 of the quantum gap as applied to the quantum gate 200, and identifies the superposed (collapsed) state as Bell state variations. Gap superposed (collapsed) states, when combined with the eight gap factors elaborated above, provide the superposed predictive wakefulness, or state-basis, to reliable emergence of 1-, 2-, 3-, and onto n-qubit states resulting from the quantum gap 100, as shown in the quantum switch, quantum router and quantum memory instances depicted in FIGS. 13 and 14a, 14b, and 14c. Formulas 21 and 22 apply to FIGS. 12, 13, and 14A-C, therein eliminating the uncertainty of the computational outcome of previous instructions.

Quantum-Mechanically Inversely-Related Input/Output, Ingress/Egress, Encoding/Decoding The preferred embodiment incorporates input/output, ingress/egress, and encoding/decoding operations that are quantum-mechanically inversely related based on calculations herein indicating magnitude density-based reciprocals of the Planck time scale ($10^{-43}$ second) at each of the Angstrom—(atomic, $10^{-10}$ m), pico—(photonic/electronic, $10^{-12}$ m), and superstring—($10^{-35}$ m) scales.

FIG. 13 shows a quantum gate 200 for storing and retrieving data held in a memory 202. The quantum gate 200 advantageously defines the intra-gap transformation mechanics such that the outcome of the most recent instruction can be predicted accurately. In effect, execution of instructions leaves a trail in the form of an n-code sequence in quantum switches, quantum routers and quantum memory registers. The memory 202 includes a plurality of addressable cells 204. A pair of computational quantum switches 206 are in communication with the memory 202 for ingress and egress of data. The data may be a single qubit, two qubits or a plurality of qubits as shown below in FIGS. 14A-C. The computational quantum switches 206 include a plurality of switches 208 arranged in $2^{n/2}$ planes, each switch 208a, 208b being a qubit in a two-to-ten dimensional Hilbert space.

Each switch 208a adjacent the memory 202 can transfer data to one of two cells across a quantum gap 100 as described in FIG. 7. The remaining switches 208b are logically associated in same-plane pair mapping, and n-plane, n-wise mapping. The n-plane, n-wise mapping is represented by lines 210 and the same-plane pair mapping is represented by lines 212. The n-plane, n-wise mapping as well as the same-plane pair mapping is governed by formulas 21 and 22.

Still referring to FIG. 13, each line 210, 212 also represents a quantum gap 100 as described in FIG. 7. If a qubit 208 is in a |0> state, data input thereto is routed into an adjacent qubit 208 on a path to a lower numbered cell 104 within the memory 202. If a qubit 208 is in a |1> state, data input thereto is routed on a path to a higher numbered cell 204 within the memory 202. If a qubit 208 is in a superposition or $(|0>+|1>/\sqrt{2})$ state, data input thereto is routed to adjacent qubits 208 on both paths to the higher and lower numbered cells 204. Since the qubits 208b are logically associated with adjacent qubits 208b in a same-plane manner (e.g., $(Q_n \rightarrow Q_{n-n})$] as Bell states [EPR pairs $(|00>+|11>)/\sqrt{2})$), as well as across a plane in n-wise manner, the data is also transmitted to the qubit 208 coupled to the receiving qubit 208b by line 210. As a result, the quantum memory gate 200 is universally unitary, measurable, and logically reversible.

FIG. 13 shows a quantum gate 200 having quantum memory and quantum switching relationships and illustrates the following:

The quantum gate computational network system is an n-quantum bit (n-qubit) quantum computational gate that is extensible to $\leq [(n^2 \text{ atoms} \times n^2 \text{ electrons and photons} \times n^2 \text{ superstrings})^2 \leq [(10^{80} \times 10^{80}) \times (10^{82} \times 10^{82}) \times (10^{105} \times 10^{105})]^2 \leq (10^{534})^2 \leq 10^{1068}$ memory cells and $\leq 2^{3548}$ switching cells].

Less than or equal to $10^{1068}$ memory cells are addressable through a $\leq 3548$-qubit quantum ($2^{3548}$-qubit) switching address structure.

The quantum gate 200 preferably operates in a $2^n$ dimensional complex Hilbert space.

Each quantum switching, quantum routing, and quantum memory register decision point in FIG. 13 proceeds by reference to the quantum gap described hereinabove.

Each circle within FIG. 13 represents a quantum switch, addressable by the qubit inscribed within. If a given qubit $|Q_n>=|0>$, the corresponding quantum switch routes the input qubit toward a lower numbered cell within the quantum memory register. If $|Q_n>=|1>$, it is routed toward a higher numbered cell within the quantum memory register. If a given qubit $|Q_n>=(|0>+|1>/\sqrt{2})$, then an equal superposition of both routes is taken within the quantum switch.

Dual-qubit superpositions are logically associated in pairwise fashion "vertically" within any given n-plane $(Q_n \rightarrow Q_{n-n})$ of the quantum switch/quantum router as Bell states, or Einstein, Podolsky, Rosen (EPR) pairs $(|00>+|11>)/\sqrt{2})$.

Figure 15:
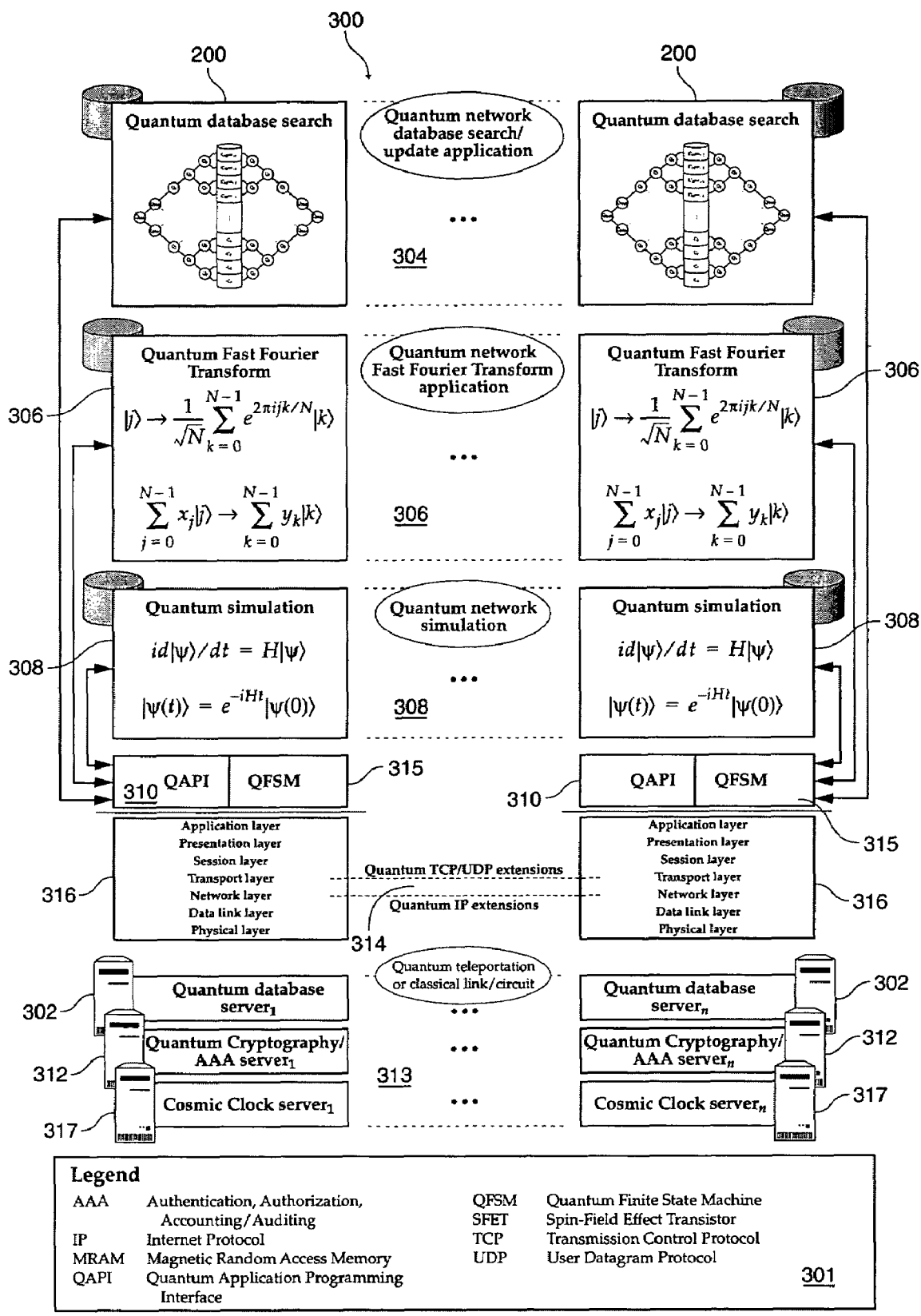
FIG. 15 is a somewhat schematic view of a network utilizing gates as shown in FIG. 13.

Multiple (n)-qubit superpositions are logically associated in n-wise fashion "vertically" throughout any given n-plane, and/or in full or partial combination and permutation, "vertically" and/or "horizontally" of n-planes of the quantum switch as $(|0 \ldots 0>+|1 \ldots 1>)/\sqrt{2})$, providing the unitary and universal basis for massively parallel, massively distributed, superdense quantum database computing (see FIG. 15).

The quantum gate 200 may logically associate dual-to-n-qubit superpositionalities over quantum teleportation links (see FIG. 15).

Any unitary operation can be approximated to arbitrary accuracy by a quantum circuit (including quantum teleportation circuit) and is therefore a universal quantum network computational gate; that is, it is universally unitary, measurable, and logically reversible.

The quantum gate 200 employs massive quantum parallelism intrinsic to processing quantum algorithms, enabling, for example, simultaneous evaluation of a function, $f(x)$, for n different values of x.

Each calculation step within the quantum switch contains complete knowledge/memory of all previous steps and its computational relationship to the quantum memory register.

Figure 14A:
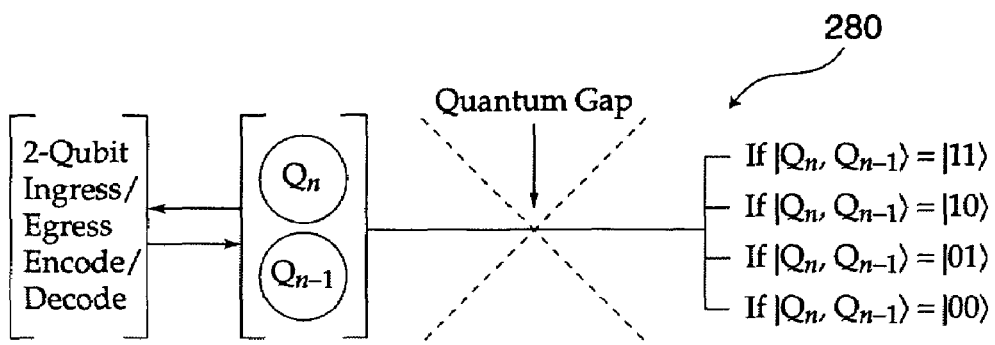
FIG. 14A is a somewhat schematic view of switching and memory encoding relationships for a 2-qubit case as may occur in the gate of FIG. 13.
Figure 14B:
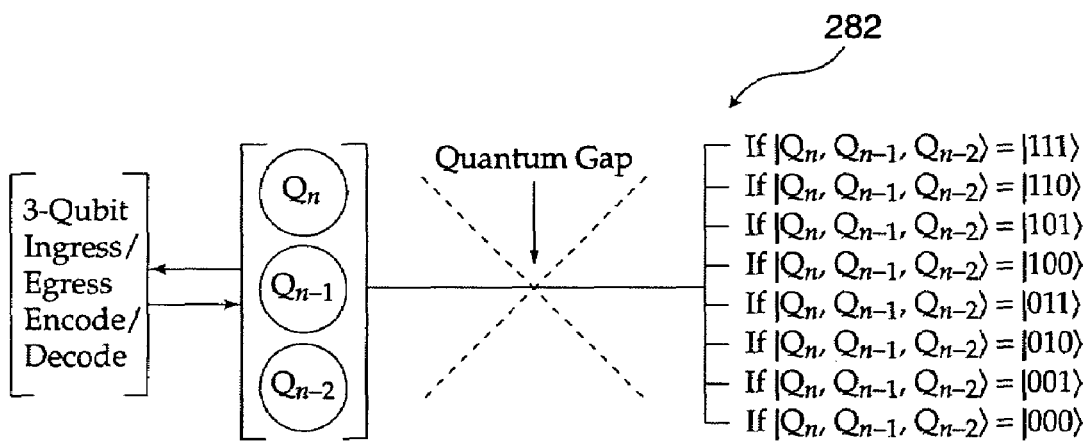
FIG. 14B is a somewhat schematic view of switching and memory encoding relationships for a 3-qubit case as may occur in the gate of FIG. 13.
Figure 14C:
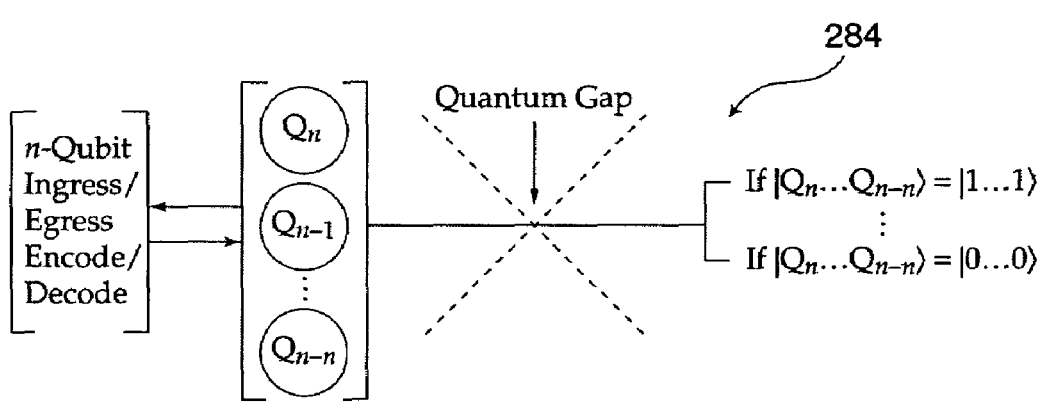
FIG. 14C is a somewhat schematic view of switching and memory encoding relationships for a n-qubit case as may occur in the gate of FIG. 13.

FIG. 14A illustrates the quantum gate 200 and quantum switching relationships with 2-qubit/4-cell ingress/egress and encode/decode, 3-qubit/8-cell, and n-qubit/n-cell ingress/egress and encode/decode as referred to generally by reference numeral 280. FIG. 14B extends the 1-qubit ingress/egress quantum switch and 1-qubit-to-2-cell memory mapping/demapping shown in FIG. 13 to 3-qubit/8-cell mapping as referred to generally by reference numeral 282. FIG. 14C extends the 1-qubit ingress/egress quantum switch and 1-qubit-to-2-cell memory mapping/demapping shown in FIG. 13 to n-qubit/n-cell mappings as referred to generally by reference numeral 284.

FIG. 15 provides a view of a massively distributed quantum computer network 300 that incorporates quantum computers and quantum networking components. A legend 301 is provided. The network 300 can advantageously employ transmitting qubits across quantum gaps to accomplish processing data according to an instruction set. Data stored within the network 300 can be searched in a quantum manner as would be appreciated by those of ordinary skill in the art based upon review of the subject disclosure.

In the quantum computer network 300, a plurality of quantum database servers 302 are running a networked quantum database search application 304, a quantum fast fourier transform (hereinafter "QFFT") application 306, and a quantum simulation application 308. The applications 304, 306, 308 are invoked by servers and clients through quantum application programming interface (hereinafter "QAPI") 310 within an operating system. The quantum application programming interface 310 sends and receives interprogram requests, replies, data, control codes and error codes based on the combined result of superposed data collapse (Formula 21) and attainment of de-collapsed quantum information state threshold (Formula 22). In the preferred embodiment, the QAPI states and state changes are governed by quantum finite state machines 315 that operate according to the combined result of superposed data collapse (Formula 21) and attainment of decollapsed quantum state thresholds (Formula 22).

A preferred interconnection approach is via quantum teleportation circuits 313. The quantum teleportation circuits 313 are logical interconnections structured atop quantum cryptographic and authentication, authorization and auditing/accounting (hereinafter "AAA") servers 312, which exchange quantum keys and authentication logic. Preferably, the AAA servers 312 are QKD servers. It is also envisioned that the quantum teleportation circuits 313 could be substituted with classical links. The quantum cryptographic and AAA servers 312, in turn, are interfaced via quantum extensions 314 to Internet Protocol Security (IPsec) protocols, and interconnected through photonic networks. The servers 302, 312 preferred runtime platform would be an optical computer with SFET MRAM and each server 302, 312 runs a multi-layer computer network environment such as shown in reference box 316.

Hence, the network 300 is a comprehensive quantum computer network realization; and a comprehensive portrayal of a distributed quantum computer network applications including, but not limited to, quantum network database, quantum cryptography, quantum AAA, quantum computer and network clocking and synchronization.

A Cosmic Clock to Ensure Flawless Temporal Operation at All Scales

The preferred embodiment 300 may include a Cosmic Clock server 317 to ensure flawless temporal operation and cycle governance in Planck ($10^{-43}$ second) and sub-Planck ($<10^{-43}$ second) time scales. At the Angstrom-(atomic, $10^{-10}$ m) and pico- (photonic/electronic, $10^{-12}$ m) quantum computational and quantum networking scales, there is no method to quantum-mechanically distinguish between two atoms; therefore, clocks based upon atomic resonators keep the same time. Terrestrial and celestial (i.e., Global Positioning System [GPS]) computer clocks and computer network clocks have switched from quartz to Cesium-133 ($Cs^{133}$), with the latter generating a frequency of transition of v=9,192,631,770 Hz (approximately equal to $9.19 \times 10^9$ Hz, or 9.19 GHz) that has become the standard definition of a second. The output of atomic oscillators, whose drift rate is approximately one part in $10^{13}$, is used as the standard for elapsed real time, known as International Atomic Time. The standard second has been defined since 1967 as 9,192,631,770 periods of transition between the two hyperfine levels of the ground state of Cesium-133 ($Cs^{133}$).

The $^{133}Cs$ stable isotope of Cesium has a nuclear spin of I=7/2 and a single outer electron that in its ground state is in an s orbital with angular momentum of L=0. Since the electron spin is S=1/2, the total angular momentum J=L+S can be + or −1/2. When the electron is parallel to the nucleus, the angular momentum of both together is F=I+J=4, and when they are anti-parallel, F=3.

The switch in computer networks from quartz to a cesium beam reduced the relative time uncertainties to approximately $10^{-12 \text{ to } -13}$. Relative time uncertainties are further diminished to approximately $10^{-15}$ when lasers are used to perform state selection and to cool the atoms, enabling them to be dropped into a gravitational fountain.

While these triple-magnitude relative time uncertainty reductions are significant, they are nonetheless insufficient to provide the clock precision required for a Cosmic Clock server 317 to temporally modulate quantum computation and quantum networking spatial scales of less than $10^{-12}$ m.

The spatial density magnitude-based reciprocity calculated herein to exist from the perspectives of each of the Angstrom (atomic, $10^{-10}$ m), pico (photonic/electronic, $10^{-12}$ m), and superstring ($10^{-35}$ m, $10^{-33}$ cm) scales, to the Planck time scale ($10^{-43}$ second), indicates a massive and mutually-predictive interrelationship between time and space at each of these quantum computing and quantum networking scales and is reflected by an $n^2$-based temporal factor applied to the three-way, $n^2$-meshed virtual associations among atomic, electronic/photonic, and superstring quantum network computational tiers. Three-way, $n^2$-meshed virtual associations among the Angstrom (atomic, $10^{-10}$ m), pico (photonic/electronic, $10^{-12}$ m) and superstring ($10^{-35}$ m, $10^{-33}$ cm) computational and networking tiers account for the necessary spatial resolutions within the quantum gate 200. This is not surprising, since the seeds of quantum mechanics were apparent in the invariance of the speed of light in Einstein's special relativity; the apparent passage of time was found to depend upon motion and gravity, at least as long as gravity itself defied quantum explanation.

Spatial and Temporal Interconnectivity

The scalar range from the spectrum of the observable universe ($10^{27}$ m) to the atomic scale ($10^{-10}$ m) is $10^{37}$, suggesting an order of $10^{43}$ atoms (calculated as $10^{80}$ atoms/$10^{37}$ cosmological-to-atomic scalar range=$10^{43}$ atoms) on average per magnitude of distance scale (a magnitude density-based reciprocal of the Planck time scale of $10^{-43}$ second).

The picoscale ($10^{-12}$ m) is completely intrinsic to quantum network computation due to the quantum properties of superposition and to quantum entanglement (the latter, where the spins of particles polarized together remain correlated, even if spatially separated).

The estimated number of electrons and photons within the observable universe is $10^{82}$, calculated as follows: $10^{80}$ atoms within the observable universe×$10^2$ magnitudes between the atomic and electronic and photonic scales=$10^{82}$. The spectral range of the observable universe ($10^{27}$ m) to the electronic and photonic scale ($10^{-12}$ m) is $10^{39}$, suggesting an order of $10^{43}$ electrons and photons on average per magnitude of distance scale (calculated as follows: $10^{82}$ electrons and photons/$10^{39}$ cosmologic to electronic scalar range=$10^{43}$ electrons and photons). Again, a magnitude density-based reciprocal of the Planck time scale of $10^{-43}$ second is calculated.

The estimated number of superstrings within the observable universe is $10^{105}$, calculated as follows: $10^{80}$ atoms within the observable universe $\times 10^{25}$ magnitudes between the atomic ($10^{-10}$ m) and Planck ($10^{-35}$ m) scales=$10^{105}$ superstrings. The spectral range of the observable universe ($10^{27}$ m) to the Planck scale ($10^{-35}$ m) is $10^{62}$, suggesting an order of $10^{105}$ superstrings divided by $10^{62}$ cosmologic-to-Planck scalar range, equaling $10^{43}$ superstrings on average per magnitude of distance scale. Once again, a magnitude density-based reciprocal of the Planck time scale of $10^{-43}$ second is calculated.

Increasingly dense and scalable interconnection calculations are achievable at $n(f+1)/2$, where, for any combination of node count, n, and fault tolerance, $f$, $(n-1)>f>0$, a K-cube-connected cycle is approached where, to ensure a truly scalable network, the minimum node degree, $f+1$, grows in proportion, $\rho_{\omega c}$, to the total number of nodes, n.

The quantum gate 200 enables interlinking within a multi-tier full-mesh fashion, where the full-mesh nodal (n) topology is defined as $n(n-1)/2$ on each of at least three quantum network computational tiers—atomic, electronic/photonic, and superstring—and where meshed virtual associations among these three network computational tiers presume connectivity at $[n(n-1)/2] \rightarrow (n^2/2) \rightarrow n^2$.

As calculated above, there exists an average magnitude density-based reciprocal of the Planck time scale of $10^{-43}$ second from the perspectives of each of the atomic, electronic, photonic, and superstring spatial scales. This reciprocity indicates a massive and mutually-predictive interrelationship between space and time at each of these scales and is reflected by an $n^2$-based temporal factor applied to the three-way, $n^2$-meshed virtual associations among atomic, electronic/photonic, and superstring quantum network computational tiers.

Quantum Gate 200 Four-Tier (Three Spatial, One Temporal) Quantum Network Computational Density Quantum gate 200 computational and connection basis states exist as a quantum computational network system of the form, $|\chi_1, \chi_2, \ldots, \chi_n>$. Therefore, a quantum state of this system is specified by $2^n$ amplitudes as follows:

$$=(n^2 \text{ atoms} \times n^2 \text{ electrons/photons} \times n^2 \text{ superstrings})^2 \text{ connections}$$

$$=[\text{Tier}_1 \text{ Atoms } (10^{80} \times 10^{80}) \times \text{Tier}_2 \text{ Electrons and Photons } (10^{82} \times 10^{82}) \times \text{Tier}_3 \text{ Superstrings } (10^{105} \times 10^{105})]^2 \text{ connections}$$

$$=10^{(534)2} \text{ connections}$$

$$=10^{1068} \text{ (Quantum Gate 200) memory cells}$$

$$=2^{3548} \text{ (Quantum Gate 200) switch cells}$$

Where:
Tier$_1$=atomic full-mesh connections=$(10^{80}$ atoms$)^2$
Tier$_2$=electronic and photonic full-mesh connections=$(10^{82}$ electrons/photons$)^2$
Tier$_3$=superstring full-mesh connections=$(10^{105}$ susperstrings$)^2$
Tier$_4$=Cosmic Clock server 317 integration that squares the three-tier space-based quantum matrix.

Quantum gate 200 quantum network computational density is therefore calculated to be on the order of less than or equal to ($\leq$) $10^{1068}$ memory cells, and $\leq 2^{3548}$ switch cells.

Figure 16:
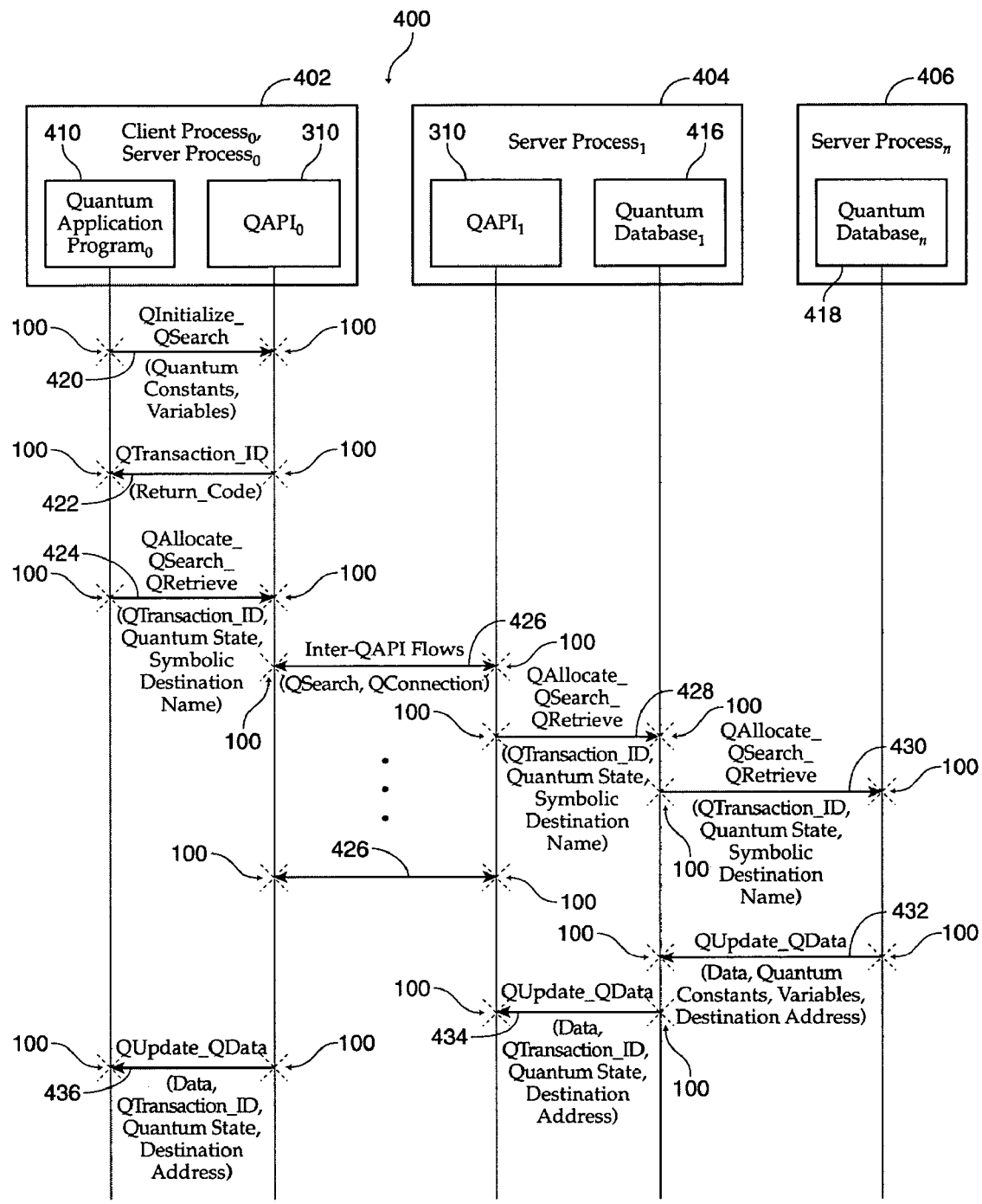
FIG. 16 is a process flow diagram for an example process as enabled by the network of FIG. 15.

Referring now to FIG. 16, a process flow diagram 400 in accordance with the subject disclosure is shown. Dashed "x" depicts where quantum gaps 100 may occur. Client process/server process area 402 contains the program-to-program interface 310 across which clients issue requests for data and servers exchange data, return codes, error codes, quantum states, quantum constants, quantum variables, and quantum data. Client process/server process area 402 also contains a quantum application program 410 for executing quantum algorithms such as the QFFT, quantum database search, quantum simulation as shown in FIG. 15. Other algorithms could be quantum counting, quantum cryptography, quantum factoring and the like.

Server process area 404 also contains the quantum application program interface 310 as well as a quantum database 416. The quantum database 416 stores target data for access by a requesting client process. The server process area extends to quantum databases as represented by server process area 406 having quantum database 418 therein.

When a client server 302 issues a program call by a user requesting access to data in the quantum databases 416-418, a server 302 receives the program call and initializes a local QSearch. An arrow 420 denotes this call that results in a quantum gap 100 as shown. The QTransaction_ID with a Return_Code is returned locally from the QAPI 310 to the quantum application program 410 as denoted by arrow 422.

Upon receipt of the QTransaction_ID, the requesting quantum application program ("QAP") 410 issues a target quantum database QAllocate_QSearch_QRetrieve request as denoted by arrow 424. This request includes QTransation_ID, quantum state, symbolic destination name. In response to the Qallocate_Qsearch_QRetreive request, bi-directional inter-QAPI flows occur and the request is passed to the server process area 404 and bilateral communication ensues between the QAPI 310 in 404 and the QAPI 310 in 402 as denoted by the double-headed arrow 426. The bilateral communication includes a plurality of quantum network exchanges. For example, the Inter-QAPI data exchanged may encompass local/remote quantum session activation and flows, local/remote quantum transport activation and flows, local/remote quantum network activation and flows, and local/remote quantum or classical link activation and flows.

After this data exchange, the requesting QAPI 310 in server process area 404 issues a target quantum database QAllocate_QSearch_QRetrieve request as denoted by arrow 428. Typically, the data transferred along arrow 428 is the QTransaction_ID, a quantum state and a symbolic destination name. In particular, the symbolic destination name is representative of the actual location of the target data. If the target data is not found in quantum database 416, the response propagates to subsequent quantum databases 418 until the target data is located as denoted by arrow 430.

At arrow 430, a QAllocate_QSearch_QRetrieve request passes from quantum database$_1$ 416 to quantum databases$_n$ 418. QTransaction_ID, quantum state and symbolic destination name are passed along arrow 430.

In response, a QUpdate_QData response passes from the quantum database$_n$ 418 to the quantum databases 416 as denoted by arrow 432. The QUpdate_QData response typically includes the target data, destination address for the requesting process, quantum constants and variables. In response to the QUpdate_Qdata being received at quantum database₁ 416, the QUpdate_QData response is passed along to QAPI 310 in server process₁ area 404 as denoted by arrow 434. At this point, the QUpdate_QData response includes the requested data, QTransaction_ID, quantum state, and destination address.

Now that this QUpdate_QData response is at QAPI 310 in area 404, the QInter-QAPI flows that are continuing as denoted by arrows 426 provide data to QAPI 310 in area 402. The process terminates by QAPI 310 in 402 passing along this QUpdate_QData response to the quantum application program₀ 410 where the target data can be ultimately accessed by the user through suitable graphical user interface.

Optical Photon Quantum Computer

Referring to FIG. 15, the network 300 can implement an optical photon quantum computer. Optical photons are chargeless particles and do not interact very strongly with each other or with other particles, and are therefore strong candidates for representing qubits. Single photons can be generated for example, by attenuating the output of a laser where the coherent state, |φ>, is defined as $$|\alpha\rangle = e^{-|\alpha|^2/2} \sum_{n=0}^{\infty} \frac{\alpha^n}{\sqrt{n!}} |n\rangle,$$ (Formula 23)

and where •n• is an n-photon energy eigenstate. Devices that can predictably generate, detect and manipulate single photons with high quantum efficiency include mirrors (high reflectivity mirrors with <0.01% loss can reflect photons and change their direction in space), phase shifters (units of transparent media with refractive index n different from that of free space) and beam splitters (partially slivered pieces of glass that reflects a fraction R of incident light and transmits 1−R). In these quantum computer realizations, quantum information is encoded both in the photon number and phase, with interferometers used to convert between the two state representations |0> and |1>. Realization of optical photon quantum computers is also encouraged by increasing reliance on optical networks (one major advantage of optical over electronic networks is that significantly less energy is required to transmit a bit or qubit using a photon over an optical fiber than that required to charge a typical 50Ω electronic transmission link over the same distance. The major drawback to realization of an optical photon quantum computer is the difficulty of realizing nonlinear Kerr media with a large ratio of cross phase modulation strength-to-absorption loss.

Optical Cavity Quantum Electrodynamics

Referring to FIG. 15, the network 300 can implement an optical cavity quantum electrodynamics. Cavity quantum electrodynamics (QED), especially the single-atom cavity, provides a potential solution to single drawback experience in an optical photon quantum computer because well-isolated single atoms do not experience the same degree of decoherence effects, and could also provide cross phase modulation between photons. However, the coupling of a photon pair is mediated by an atom and coupling a photon into and out of the cavity becomes difficult, limiting cascadibility and scalability.

Nuclear magnetic Resonance

Referring to FIG. 15, the network 300 can implement a nuclear magnetic resonance. Nuclear magnetic resonance (NMR) directly manipulates and detects nuclear spin states using radio frequency (RF) waves. Two major issues inherent in using NMR to realize a quantum computer are: (1) Approximately $10^8$ molecules must be present in order to produce a measurable induction signal, and (2) NMR is generally applied to systems in equilibrium at ambient room temperature, meaning that the initial state of the spins is nearly completely random. However, one of the greatest strengths of realizing a quantum computer through NMR is that NMR realizes arbitrary unitary transforms on a spin system to small granularity using radio frequency (RF) pulses.

Ion Trap

Referring to FIG. 15, the network 300 can implement an ion trap. The main components of an ion trap quantum computer are an electromagnetic trap with lasers, photodetectors and ions. Ion traps are used to tune incident monochromatic light to selectively cause transitions that change certain atomic and nuclear spin states depending upon other spin states. A particle has spin when it possesses a magnetic moment as if it were a composite particle with current running in a loop. Bosons—including photons—are integer spin particles, are massless, and have spin ±1 (corresponding to orthogonal polarization states) with no spin 0 components.

Fermions—including electrons, protons and neutrons—are spin-1/2 particles, meaning that their spin component is either +1/2 spin (spin-up) or −1/2 spin (spin-down). Generally, 'spin' refers to a spin −1/2 particle. In general, spin states provide good representations for quantum computation and information because they live in an inherently finite state space, where quantum computation with trapped ions is predicated on the ability to construct arbitrary unitary transforms on the internal states of the atoms. The greatest drawback to realization of an ion trap quantum computer is the weakness of the phonon-mediated spin-spin coupling technique and its decoherence susceptibility.

Harmonic Oscillator Quantum Computer

Referring to FIG. 15, the network 300 can implement a harmonic oscillator. A harmonic oscillator is a particle in a parabolic potential well, $V(x)=mw^2x2/2$. Quantum computation is enabled by taking a finite subset of discrete energy eigenstates of a simple harmonic oscillator |n> where n=0, 1, ..., ∞, and the qubits have lifetimes determined by physical parameters such as the cavity factor Q, and unitary transforms can be applied by allowing the quantum system to evolve over time. In this system, n qubits are provided via energy levels |0>, |1>, ..., |$2^n$>. Unfortunately, a single harmonic oscillator does not currently enable digital information representation.

Square Well Quantum Computer

Still referring to FIG. 15, the network 300 can implement a square well. A square well or a particle within a one-dimensional box is a prototypical quantum system and behaves according to Schrödinger's equation, $$i\hbar \frac{d|\psi\rangle}{dt} = H|\psi\rangle,$$

where h is a physical constant (Planck's constant) whose value must be experimentally determined. Absorbing h into H effectively sets h=1, where H is a fixed Hermitian operator known as the Hamiltonian of the closed system. Knowledge of the Hamiltonian of a system, taken together with knowledge of h provides a complete understanding of the dynamics of the system. Single qubits can be represented by the two lowest levels in a square well potential. However, finite square wells are just sufficiently deep to contain two bound states; transitions from any given set of bound states to a continuum of bound states is possible, leading to decoherence that can obviate qubit superpositionality.

Further Quantum Computer Realizations

Atomic, molecular and optical quantum computing realizations for quantum computers are under increasing development focus. It is also quite likely that we will see quarks, mesons and gluons investigated as implementation platforms. It is also the case that greater than US$1 trillion is estimated to have been invested in silicon technology since the invention of the transistor in the late 1940s; therefore, the impetus to perfect a solid state quantum computer is also quite significant.

While the invention has been described with respect to preferred embodiments, those skilled in the art will readily appreciate that various changes and/or modifications can be made to the invention without departing from the spirit or scope of the invention as defined by the appended claims.

What is claimed is:

1. A method for transmitting data across an interface, the method comprising the steps of:
   creating a quantum gap between an origin and a destination;
   inputting data to the origin for transmission to the destination;
   collapsing the data to a point value within the quantum gap based on a one of a software instruction and a hardware state change; and
   restructuring the data at the destination, wherein dynamics of restructuring are governed by the expression:

$$\sum_{|Q_n\rangle}^{|Q_{n-n}\rangle} \frac{1}{2\sqrt{2}} \rightarrow \sum_{|Q_n, \ldots, Q_{n-n}\rangle}^{|Q_{(n-n)-n}\rangle} \frac{1}{n\sqrt{2}}.$$

2. A method as recited in claim 1, wherein the data at the point value of the quantum gap is defined by $(|Q_n, \ldots, Q_{n-n}\rangle = |0 \ldots 0\rangle + |1 \ldots 1\rangle/\sqrt{2})$ where the quantum gap has n-qubits and n-quantum memory cells.

3. A method as recited in claim 1, wherein the origin and the destination are quantum switches.

4. A method as recited in claim 1, wherein the origin is a quantum switch and the destination is a memory cell.

5. A method as recited in claim 1, further comprising the steps of collapsing the data to a point value within a plurality of quantum gaps based on a software instruction, and restructuring the data at a plurality of destinations to form a unitary, measurable, and logically reversible quantum memory having a plurality of cells and quantum switches for storing and retrieving data from the cells.

6. A method as recited in claim 1, further comprising the step of collapsing data to a point value based on a hardware state.

7. A system for transmitting data across a quantum gap comprising:
   first means for transforming the data having an original value into a point value;
   second means for restructuring the point value to the original value.

8. A system as recited in claim 7, wherein the first means is a first portion of a quantum gap and the second means is a second portion of a quantum gap, wherein transforming and restructuring is governed by the expression:

$$\sum_{|Q_n\rangle}^{|Q_{n-n}\rangle} \frac{1}{2\sqrt{2}} \rightarrow \sum_{|Q_n, \ldots, Q_{n-n}\rangle}^{|Q_{(n-n)-n}\rangle} \frac{1}{n\sqrt{2}}.$$

9. A distributed quantum computer network comprising:
   a plurality of quantum database servers running a networked quantum database search application, a quantum fast fourier transform application, and a quantum simulation application;
   a quantum application programming interface sending and receiving data between the plurality of quantum database servers based on a combined result of superposed data collapse and attainment of de-collapsed quantum information state threshold.

10. A distributed quantum computer network as recited in claim 9, wherein the attainment of de-collapsed quantum information state threshold is governed by $$\sum_{|Q_n\rangle}^{|Q_{n-n}\rangle} \frac{1}{2\sqrt{2}} \rightarrow \sum_{|Q_n, \ldots, Q_{n-n}\rangle}^{|Q_{(n-n)-n}\rangle} \frac{1}{n\sqrt{2}}.$$

11. A distributed quantum computer network as recited in claim 9, wherein the superposed data collapse is governed by $[(|Q_n, \ldots, Q_{n-n}\rangle = |0 \ldots 0\rangle + |1 \ldots 1\rangle/\sqrt{2})]$.

12. A distributed quantum computer network as recited in claim 9, wherein the data sent and received from the quantum application programming interface is interprogram requests, replies, data, control codes and error codes.

13. A distributed quantum computer network as recited in claim 9, wherein the applications are invoked by servers and clients through the quantum application programming interface 310 within an operating system.

14. A distributed quantum computer network as recited in claim 13, wherein quantum application programming interface states and state changes are governed by quantum finite state machines 315 that operate according to the combined result of superposed data collapse and attainment of de-collapsed quantum state thresholds.

15. A distributed quantum computer network as recited in claim 9, wherein an interconnection approach between the plurality of quantum database servers is via quantum teleportation circuits.

16. A distributed quantum computer network as recited in claim 9, wherein the plurality of quantum database servers utilize a plurality of quantum gate having a plurality of quantum switches to accomplish quantum cryptography, quantum AAA, quantum computer and network clocking and synchronization.

17. A distributed quantum computer network as recited in claim 16, wherein each quantum gate can simultaneously evaluate a function $f(x)$ for n different values of x.

18. A distributed quantum computer network as recited in claim 17, wherein each calculation step within evaluating the function $f(x)$ contains memory of previous steps and computational relationships to a quantum memory register.

19. A distributed quantum computer network as recited in claim 16, wherein when a qubit is input to one of the quantum gates, dual-qubit superpositions are logically associated in a pair-wise fashion within an n-plane represented by $(Q_n \rightarrow Q_{n-n})$ of the quantum switches within the quantum gate as Bell states represented by $(|00>+|11>)/\sqrt{2}$.

20. A distributed quantum computer network as recited in claim 16, wherein: if an input qubit represented by $(|Q_n>=|0>)$ is input to one of the quantum gates, the quantum switch of the quantum gate routes the input qubit toward a lower-numbered cell of a memory register; if an input qubit represented by $(|Q_n>=|1>)$ is input to one of the quantum gates, the quantum switch of the quantum gate routes the input qubit toward a higher-numbered cell of a memory register; and if an input qubit represented by $(|Q_n>=|0>+|1>/\sqrt{2})$ is input to one of the quantum gates, the quantum switch of the quantum gate routes the input qubit to an equal superposition towards a lower is taken based on single-qubit logic derived from the Bell state $(|00>+|11>)/\sqrt{2}$ toward higher-numbered cell and a lower-numbered cell of a memory register.

21. A distributed quantum computer network as recited in claim 16, wherein each memory register is a quantum memory register.

22. A distributed quantum computer network as recited in claim 16, wherein each quantum gate operates within a $2^n$ to $10^n$ dimensional complex Hilbert space.

23. A distributed quantum computer network as recited in claim 16, wherein each quantum gate is universally unitary, measurable, and logically reversible.

24. A distributed quantum computer network as recited in claim 16, wherein each quantum gate.

25. A distributed quantum computer network as recited in claim 16, wherein each quantum gate embodies probabilistic processing memory back into an infinite past for insuring.

26. A distributed quantum computer network as recited in claim 16, wherein each quantum gate exhibits coexistence of computational simultaneity and sequentiality.

27. A distributed quantum computer network as recited in claim 16, wherein for each quantum gate, quantum information flow is generated through quantized probability amplitudes of superposed transitions resulting from collapse over possible computational trajectories achievable in time t into n qubits.

28. A distributed quantum computer network as recited in claim 16, wherein each quantum gate has ingress and egress of n-qubit/n-cell mappings to quantum switches, quantum routers, quantum memory registers associated therewith.

29. A distributed quantum computer network as recited in claim 16, wherein each quantum gate has mapping and demapping of n-qubit/n-cell mappings to quantum switches, quantum routers, quantum memory registers associated therewith.

30. A distributed quantum computer network as recited in claim 16, further comprising registers inextricably interlinked in a multi-tier, full-mesh fashion in each quantum gate, where an extended nodal interconnection topology is specified by a range of $2^n$ to $10^n$ probability amplitudes.

31. A superstring gate comprising:
an n-subit superstring memory register having a plurality of subits for storing and retrieving an exponential number of inputs; and
a polynomial number of subits in communication with the plurality of subits for addressing the n-subit superstring memory register.

32. A quantum gate comprising:
an n-qubit quantum memory register having a plurality of qubits for storing and retrieving an exponential number of inputs; and
a polynomial number of qubits in communication with the plurality of qubits for addressing the n-qubit quantum memory register.

33. A cosmic clock server for providing temporal operation and cycle governance in Planck and sub-Planck time scales, the cosmic clock server comprising:
a server for clocking at an average magnitude density-based reciprocal of a Planck time scale of $10^{-43}$ second from a perspective of each of an atomic, an electronic, a photonic, and a superstring spatial scale, wherein the reciprocal indicates a massive and mutually-predictive interrelationship between space and time at each scale and is reflected by an $n^2$-based temporal factor to three-way, $n^2$-meshed virtual associations among atomic, electronic/photonic, and superstring network quantum computational tiers.

34. A cosmic clock server as recited in claim 33, further comprising at least one networked quantum memory register in communication with the server wherein dense and scalable interconnection calculations are achievable at $n(f+1)/2$, where, for any combination of node count, n, and fault tolerance, $f$, $(n-1)>f>0$, a K-cube-connected cycle is approached where, to ensure a synchronized, scalable network, a minimum node degree, $f+1$, grows in proportion to the node count, n.

35. A cosmic clock server as recited in claim 33, further comprising:
quantum memory registers in communication with the server for storing and retrieving data;
networked quantum switches in communication with the server for addressing the quantum memory registers; and
networked quantum routers in communication with the server for directing data to the quantum memory registers,
wherein the quantum memory registers, the networked quantum switches and the networked quantum routers are arranged in a multi-tier full-mesh fashion, where a full-mesh nodal (n) topology is defined as $n(n-1)/2$ on each of at least three quantum network computational tiers and meshed virtual associations among the at least three quantum network computational tiers presume connectivity at $[n(n-1)/2] \rightarrow (n^2/2) \rightarrow n^2$.

* * * * *